United States Patent
Sequeira

(10) Patent No.: US 8,566,897 B2
(45) Date of Patent: Oct. 22, 2013

(54) SYSTEM AND METHOD FOR A MASTER SCHEDULER

(75) Inventor: William J. Sequeira, Oakland, CA (US)

(73) Assignee: Banbury Technologies LLC, Wilmington, DE (US)

(*) Notice: Subject to any disclaimer, the term of this patent is extended or adjusted under 35 U.S.C. 154(b) by 49 days.

(21) Appl. No.: 13/117,437

(22) Filed: May 27, 2011

(65) Prior Publication Data

US 2011/0231888 A1 Sep. 22, 2011

Related U.S. Application Data

(60) Division of application No. 12/643,729, filed on Dec. 21, 2009, now Pat. No. 8,001,578, which is a continuation of application No. 09/725,792, filed on Nov. 29, 2000, now Pat. No. 7,665,117, which is a division of application No. 09/137,618, filed on Aug. 21, 1998, now Pat. No. 6,222,530.

(51) Int. Cl.
*H04N 7/16* (2011.01)

(52) U.S. Cl.
USPC ........................................ 725/145; 725/146

(58) Field of Classification Search
USPC ............................................... 725/145, 146
See application file for complete search history.

(56) References Cited

U.S. PATENT DOCUMENTS

| | | | |
|---|---|---|---|
| 2,341,382 A | 2/1944 | Jensen | |
| 5,027,400 A | 6/1991 | Baji et al. | |
| 5,099,319 A | 3/1992 | Esch et al. | |
| 5,311,423 A | 5/1994 | Clark | |
| 5,499,046 A | 3/1996 | Schiller et al. | |
| 5,559,549 A * | 9/1996 | Hendricks et al. | 725/50 |
| 5,583,937 A | 12/1996 | Ullrich et al. | |
| 5,583,994 A | 12/1996 | Rangan | |
| 5,659,350 A | 8/1997 | Hendricks et al. | |
| 5,748,489 A | 5/1998 | Beatty et al. | |
| 5,818,441 A | 10/1998 | Throckmorton et al. | |
| 5,850,218 A | 12/1998 | LaJoie et al. | |
| 5,892,915 A * | 4/1999 | Duso et al. | 709/219 |
| 6,008,803 A | 12/1999 | Rowe et al. | |
| 6,035,304 A | 3/2000 | Machida et al. | |
| 6,134,596 A | 10/2000 | Bolosky et al. | |
| 6,141,336 A | 10/2000 | Bauchot et al. | |
| 6,173,330 B1 * | 1/2001 | Guo et al. | 709/232 |
| 6,222,530 B1 | 4/2001 | Sequeira | |
| 6,606,748 B1 | 8/2003 | Tomioka et al. | |
| 7,665,117 B2 | 2/2010 | Sequeira | |
| 2003/0158940 A1 * | 8/2003 | Leigh | 709/226 |

FOREIGN PATENT DOCUMENTS

| | | |
|---|---|---|
| EP | 0493098 A | 7/1992 |
| WO | 9528799 A | 10/1995 |

OTHER PUBLICATIONS

Office Action from U.S. Appl. No. 09/725,792 dated May 10, 2005 (11 pages).

(Continued)

*Primary Examiner* — Dominic D Saltarelli

(57) ABSTRACT

A system and method for associating and controlling multimedia supporting events with a primary event. The events are translated into tasks and sent to media servers for execution at a predetermined time by being further translated into media specific tasks to control a bit-pump.

17 Claims, 39 Drawing Sheets

(56) References Cited

OTHER PUBLICATIONS

Office Action from U.S. Appl. No. 09/725,792 dated Jan. 9, 2006 (12 pages).
Office Action from U.S. Appl. No. 09/725,792 dated Oct. 4, 2006 (9 pages).
Office Action from U.S. Appl. No. 09/725,792 dated Mar. 22, 2007 (10 pages).
Office Action from U.S. Appl. No. 09/725,792 dated Nov. 19, 2007 (9 pages).
Office Action from U.S. Appl. No. 09/725,792 dated Jun. 5, 2008 (9 pages).
Office Action from U.S. Appl. No. 09/725,792 dated Oct. 27, 2008 (12 pages).
Kaneko H., et al., Integrated scheduling of multimedia and hard real-time tasks, Dec. 6, 1996, pp. 206-217, Real-Time Systems Symposium, 17th IEEE.
Shahab Baqai et al., Quality-Based Evaluation of Multimedia Synchronization Protocols for Distributed Multimedia Information Systems, Mar. 20, 1996, pp. 1388-1403, IEEE Journal on Selected Areas in Communications, vol. 14, No. 7.
Yeali S. Sun, Performance Analysis of Application-Level Traffic Shaping in a Real-Time Multimedia Conferencing System on Ethernets, Oct. 16, 1996, 9 pages, IEEE.
International Search Report dated Feb. 10, 2000, regarding PCT/US99/19028, 1 page.
Office Action from CA Appl. No. 2,341,382 dated Apr. 7, 2009 (2 pages).
Supplementary Partial European Search Report EP 99 94 2366 dated Oct. 11, 2004.

* cited by examiner

| | 12:00 PM | 1:00 PM | 2:00 PM | 3:00 PM |
|---|---|---|---|---|
| HOME | | | | |
| MSB-101 | | MSB \|config1.dat | | |
| MSB-102 | MSB \|config2.dat | | | |
| INET-101 | | | INET \| c:\lippaiser | |
| INET-102 | | | | |
| KABC | ▸TV\|ESPY | | | |
| KCBS | | | | |
| KTVU | | | | |
| KNBC | | | | |
| COURT | | | | |
| CNN | | | | |
| TBS | | | | |

PROGRAM SERVICES MASTER SCHEDULER
FILE EDIT VIEW SELECT
DATE AUGUST 26TH, 1997  TIME 12:00 TO 01:00  SERVICE KABC  EVENT ESPY.MPG

| SERVICES | PROGRAMS | EVENTS | SELECT | CLEAR | INSERT | UPDATE | DELETE | | |
|---|---|---|---|---|---|---|---|---|---|
| ServiceID | ProviderID | ServiceName | StartDate | StartTime | StopDate | StopTi | | | |
| 2 | COURT | COUR | 1997-08-25 | 00:00:00 | 1997-09-04 | 00:00:( | | | |
| 1 | KABC-ABC | KABC | 1997-08-25 | 00:00:00 | 1997-09-04 | 00:00:( | | | |

FIG. 18

| ProgramTitle | ServiceID | ProgramID | StartDate | StartTime | StopDate | StopTime | TYPE | PPV |
|---|---|---|---|---|---|---|---|---|
| ESPY | 1 | 975 | 1997-08-26 | 12:00:00 | 1997-08-26 | 13:00:00 | TV | N |

FIG. 19

| SELECT | INSERT | UPDATE | DELETE | CLEAR | | GDC DATABASE | ⊠ |
|---|---|---|---|---|---|---|---|
| AssetURL | | ProgramID | SpoolID | Bandwidth | QueueSlot | | |
| /americast/code/input/sworks.m2t | | 201 | 1 | 5300000 | P | | |
| /americast/code/input/ESPY.MPG | | 401 | 1 | 5300000 | P | | |
| ESPY.MPG | | 402 | 1 | 10 | D | | |
| sworks.2mt | | 403 | 1 | 10 | D | | |
| ESPY.MPG | | 404 | 1 | 10 | D | | |
| sworks.2mt | | 405 | 1 | 10 | D | | |
| ESPY.MPG | | 406 | 1 | 10 | D | | |
| sworks.2mt | | 407 | 1 | 10 | D | | |
| ESPY.MPG | | 1004 | 100 | 10 | P | | |
| ESPY.MPG | | 1008 | 100 | 10 | P | | |
| ESPY.MPG | | 1032 | 100 | 10 | P | | |
| dummy.xyp | | 1034 | 100 | 10 | P | | |
| sworks.2mt | | 1036 | 100 | 10 | P | | |
| ESPY.MPG | | 1056 | 100 | 10 | P | | |

MSB DATABASE

| PROGRAMS | EVENTS | TYPES | SELECT | CLEAR | INSERT | UPDATE | DELETE |

ProgramID.... [1010]   START DATE... [1997-08-26]   START TIME... [12:00:00]

CombinerID... [102]    END DATE...... [1997-08-26]   END TIME...   [01:00:00]

| ProgramID | CombID | StartDate | StartTime | StopDate | StopTime |
|---|---|---|---|---|---|
| 100 | 102 | 1997-09-05 | 23:59:00 | 1997-09-05 | 23:59:30 |
| 200 | 103 | 1997-09-05 | 23:59:00 | 1997-09-05 | 23:59:30 |
| 1010 | 102 | 1997-08-26 | 12:00:00 | 1997-08-26 | 01:00:00 |
| 1018 | 102 | 1997-08-26 | 12:00:00 | 1997-08-26 | 01:00:00 |
| 1020 | 102 | 1997-08-26 | 12:00:00 | 1997-08-26 | 01:00:00 |
| 1022 | 102 | 1997-08-26 | 12:00:00 | 1997-08-26 | 01:00:00 |
| 1024 | 102 | 1997-08-26 | 12:00:00 | 1997-08-26 | 01:00:00 |
| 1026 | 102 | 1997-08-26 | 12:00:00 | 1997-08-26 | 01:00:00 |
| 1028 | 102 | 1997-08-26 | 12:00:00 | 1997-08-26 | 01:00:00 |
| 1038 | 102 | 1997-08-26 | 12:00:00 | 1997-08-26 | 01:00:00 |

FIG. 21

INET DATABASE

[SELECT] [CLEAR] [INSERT] [UPDATE] [DELETE]

DESCRIP FILE...... c:\ippa\services\weather.sdf            ProgramID...... [1001]

ServiceID........... [20]              START DATE... [1997-09-08]    START TIME... [18:06:30]

SERVICE NAME... [WeatherServic]  END DATE...... [1997-09-08]    END TIME...... [22:30:00]

| SvcDescFile | ProgramID | ServiceID | ServiceName |
|---|---|---|---|
| c:\ippa\services\stock.sdf | 1000 | 10 | StockService1 |
| c:\ippa\services\weather.sdf | 1001 | 20 | WeatherService1 |
| c:\ippa\services\traffic.sdf | 1002 | 30 | TRAFFIC |
| c:\ippa\services\stock.sdf | 1006 | 0 | SERVICE DESCRIPTION FILE |
| c:\ippa\services\traffic.sdf | 1012 | 0 | WEATHER IPPA |
| c:\ippa\services\weather.sdf | 1014 | 0 | WEATHER IPPA |
| c:\ippa\services\stock.sdf | 1016 | 0 | WEATHER IPPA |
| c:\ippa\services\stock.sdf | 1030 | 0 | STOCK IPPA |

| SERVICE | 7:00pm | 7:30pm | 8:00pm | 8:30pm | | | | |
|---------|--------|--------|--------|--------|---|---|---|---|
| TV: 52 | STAR TREK IV | ▸FRIENDS | DC: TEXT_CAPTIONS | | | | | |
| PPV: 75 | | | IPPA: FRIENDS_FACTS | | | | | |
| TV: 90 | BOXING | | | | | | | |

FIG. 24A

| SERVICE | 7:00pm | 7:30pm | 8:00pm | 8:30pm |
|---|---|---|---|---|
| TV: 52 | STAR TREK IV | FRIENDS | | |
| PPV: 75 | | | DC: TEXT_CAPTIONS | |
| TV: 90 | | | B IPPA: FRIENDS_FACTS | |
| | | | | |
| | | | | |
| | | | | |
| | | | | |
| | | | | |
| | | | | |

FIG. 24B

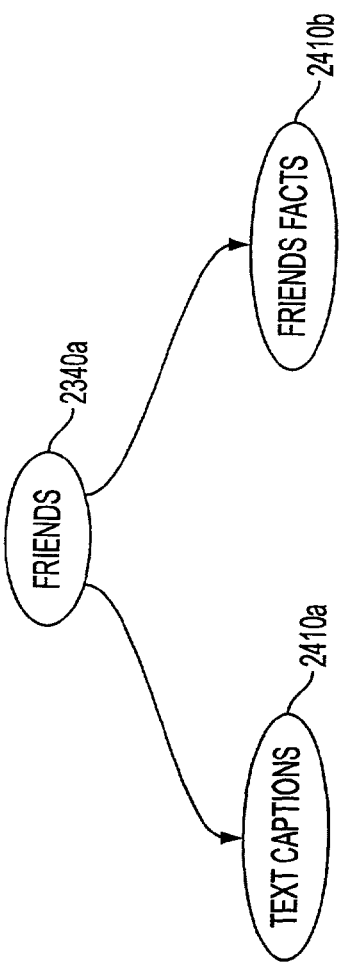
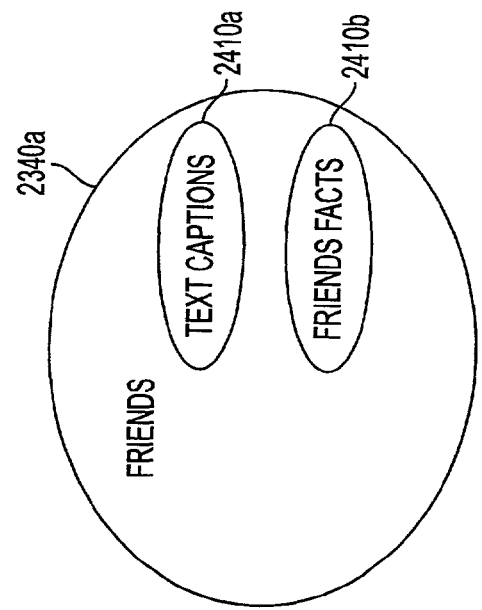
FIG. 24C
FIG. 24D

| eventID | programID | CHANNEL | EVENT NAME | START TIME | END TIME | SERVICE TYPE |
|---|---|---|---|---|---|---|
| 1 | 1 | 52 | FRIENDS | 7:30pm | 8:00pm | TV |
| 2 | 1 | 52 | FRIENDS TEXT_CAPTIONS | 7:30pm | 8:00pm | DC |
| 3 | 1 | 52 | FRIENDS FRIENDS_FACTS | 7:30pm | 8:00pm | IPPA |
| 4 | 5 | 75 | STAR TREK IV | 7:00pm | 8:30pm | NVOD |
| 5 | 7 | 90 | BOXING | 7:00pm | 8:30pm | TV |
| | | | | | | |
| | | | | | | |

FIG. 25

| 2610 | eventID | FILENAME | SIZE | PID | TRANSPONDER |
|---|---|---|---|---|---|
| 2610a | 2 | TEXT_CAPTIONS.txt | 50K | 90037 | 3 |
|  |  |  |  |  |  |
|  |  |  |  |  |  |

| 2710 | eventID | URL | PID |
|---|---|---|---|
| 2710a | 3 | FRIENDS_FACTS.sdf | 80716 |
|  |  |  |  |
|  |  |  |  |

| eventID | FILENAME | SIZE | PID | TRANSPONDER |
|---|---|---|---|---|
| 4 | STAR TREK IV | 500 MEG | 90020 | 10 |
| | | | | |
| | | | | |

| eventID | CHANGE TYPE |  |
|---|---|---|
| 1 | CHANGE TIME |  |

| eventID | CHANGE TYPE | REGISTERED PROCEDURE |
|---|---|---|
| 1 | CHANGE TIME | Tmr_ChangeEventTime (2, <NEW TIME>) |
| 1 | CHANGE TIME | Tmr_ChangeEventTime (3, <NEW TIME>) |

3010 / 3010a / 3010b / 3020 / 3020a / 3020b / 3020c / 3000

| eventID | programID | CHANNEL | EVENT NAME | START TIME | END TIME | SERVICE TYPE |
|---|---|---|---|---|---|---|
| 1 | 1 | 52 | FRIENDS | 9:00pm | 9:30pm | TV |
| 2 | 1 | 52 | TEXT_CAPTIONS | 9:00pm | 9:30pm | DC |
| 3 | 1 | 52 | FRIENDS_FACTS | 9:00pm | 9:30pm | IPPA |
| 4 | 5 | 75 | STAR TREK IV | 7:00pm | 8:30pm | NVOD |
| 5 | 7 | 90 | BOXING | 7:00pm | 8:30pm | TV |

| DATE | START TIME | END TIME | TASKID | COMMAND | CMD DATA | ASSET LIST |
|---|---|---|---|---|---|---|
| 1997-08-01 | 8:59:57pm | 9:30pm | 1:2 | PLAY | | TEXT_CAPTIONS.txt |

| DATE | START TIME | EXEC TIME | END TIME | TASKID | COMMAND | CMD DATA | ASSET LIST |
|---|---|---|---|---|---|---|---|
| 1997-08-01 | 9:00pm | 8:59:57pm | 9:30pm | 1:2 | PLAY | | TEXT_CAPTIONS.txt |

3210a / 3210b / 3210h / 3210c / 3210d / 3210e / 3210f / 3210g

3201

| 3210a | 3210b | 3210c | 3210d | 3210e | 3210f | 3210g |
|---|---|---|---|---|---|---|
| DATE | START TIME | END TIME | TASKID | COMMAND | CMD DATA | ASSET LIST |
| 1997-08-01 | 8:59:57pm | 9:30pm | 1:3 | PLAY | | FRIENDS_FACTS.sdf |
| | | | | | | |
| | | | | | | |

FIG. 33A

| 3210a | 3210b | 3210h | 3210c | 3210d | 3210e | 3210f | 3210g |
|---|---|---|---|---|---|---|---|
| DATE | START TIME | EXEC TIME | END TIME | TASKID | COMMAND | CMD DATA | ASSET LIST |
| 1997-08-01 | 9:00pm | 8:59:57pm | 9:30pm | 1:3 | PLAY | | FRIENDS_FACTS.sdf |
| | | | | | | | |
| | | | | | | | |

FIG. 33B

SYSTEM AND METHOD FOR A MASTER SCHEDULER

CROSS-REFERENCE TO RELATED APPLICATIONS

This application is a divisional of U.S. patent application entitled "System and Method For a Master Scheduler", Ser. No. 12/643,729 filed Dec. 21, 2009, which is a continuation of U.S. patent application entitled "System and Method for a Master Scheduler", Ser. No. 09/725,792, filed 29 Nov. 2000 (now U.S. Pat. No. 7,665,117), which is a divisional of U.S. patent application entitled "System and Method for a Master Scheduler", Ser. No. 09/137,618, filed 21 Aug. 1998 (now U.S. Pat. No. 6,222,530), both of which are herein incorporated by reference and continued preservation of which is requested.

FIELD OF THE INVENTION

This invention relates to a system and method for controlling, identifying and coordinating multimedia assets for a broadcast program and for increasing the tolerance of broadcast systems to the failure of the scheduler.

DESCRIPTION OF THE RELATED ART

The task of producing a broadcast program is a complicated, time consuming and error-prone job. Traditionally, a programmer (which is understood by one skilled in the art to be a person who creates a broadcast schedule, in contrast to a computer programmer who writes code) assigns a broadcast program (a broadcast event), to a time slot and ensures that other events, like interstitial, such as commercials, are available to be inserted into the output stream when a cue tone is detected. If the programmer desires to add other types of information, such as multimedia data, the programming is complicated even further and may not even be possible using current broadcast scheduling technology.

There are generally two classes of program schedulers. The first class are traffic system schedulers and these type of schedulers are used primarily in analog and analog-digital hybrid broadcast systems. A common use for this type of scheduler is to sell advertising space to broadcast sponsors and to control the allocation of ads within a broadcast stream. Generally, program schedulers in this class, use the well-known cue tone method. To schedule a program, a programmer would enter into the scheduler the time when a movie or show was to be broadcast and a list of interstitials that are to be inserted into the movie during the broadcast of the movie. At the appropriate time, the program scheduler itself would, for example, initiated playing the scheduled movie and prepare the devices, such as tape drives, containing the list of interstitials. Interspersed within the movie are cue tones to indicate where interstitials are to be inserted. A cue tone detector detects the cue tone and inserts an interstitial from the list into the output stream of the movie at each detected cue tone by controlling the device to output the requested interstitial. Ads, treated as interstitial, are thus merged into a single output broadcast stream.

A second class of program schedulers are broadcast schedulers. These schedulers are used not only to control devices but to also and identify the flow of the various parts of a broadcast program. An electronic program guide ("EPG") is created from the program schedule data. Broadcast schedulers may interface with other databases, such as system configuration and product databases. In a digital broadcast system (in contrast to an analog broadcast system) the programmer inputs the time that a media bit pump (such as a device to play a DVD movie or even a tape drive) is to play a specific event, where the media resides, what media bit pump should play it and how to control the media bit pump. This information often resides in one or more databases, which can be, for instance, flat-file, relational or object-oriented databases. The typical broadcast scheduler would continuously examine the database and, at the scheduled time, the broadcast scheduler would control the appropriate media server to play the desired broadcast event.

Current broadcast schedulers may be further divided into centralized and distributed architectures. Centralized broadcast schedulers utilizing a centralized architecture are very basic and serve primarily as a repository for data. These types of broadcast schedulers I directly control devices such as tape drives and have little or no capability in terms of controlling these devices remotely.

Distributed broadcast schedulers are more sophisticated than centralized broadcast schedulers and may include the ability to control devices remotely, that is, the devices and the scheduler do not have to be in the same computer, but may be connected through a network. Although these schedulers often have more sophisticated interfaces to databases than other schedulers, they too can only schedule broadcast events. In operation, when the scheduled time for arrives to broadcast, a movie, for instance, the distributed broadcast scheduler sends out an agent to set-up the movie located on the media bit pump and begin playing the movie. Examples of distributed architecture schedulers are systems by SunUp and Lysis.

One of major limitation of all these schedulers is that the devices, whether they are bit pumps or analog devices such as tape drives, are unable to operate independently without the scheduler controlling these devices. The scheduler is a single point of failure and in the event of a scheduler failure, the entire broadcast system would fail.

Other limitations of the prior art schedulers, include their inability to handle different types of events in addition to simply inserting interstitials. A particular vexing problem is their inability to handle multimedia events. Existing schedulers can deal with a single type of event, but in today's interactive television and digital and multimedia world, it is desirable to be able to schedule and associate a number of events with a broadcast program. These events may include, for instance, information from an Internet site and supplemental information about the broadcast program itself.

Another limitation is that prior art schedulers are unable to synchronize with other devices. Yet another limitation is that they can handle only one service model—the traditional broadcast service model with interstitials. Yet further, they cannot integrate new devices and media servers rapidly and easily, do not integrate with content management and do not support last minute schedule changes and transmissions to a set-top box ("STB").

Because of these deficiencies, prior art schedulers are unable to provide the necessary services required in today's interactive television environment. Accordingly, there is a need in interactive TV to address the deficiencies of prior art schedulers.

SUMMARY OF THE INVENTION

The present invention solves these deficiencies by providing, in accordance with one aspect of the present invention supporting events which are associated with primary events via a graphical user interface. In another aspect of the invention, a distributed broadcast scheduler architecture is disclosed which addresses the deficiencies of prior art program schedulers where devices, such as media servers and tape drives can operate independently of the scheduler by being providing, in accordance with one aspect of the invention, a Master Scheduler and a Slave Task Scheduler thereby ensuring that a failure of the Master Scheduler does not bring down the entire broadcast system. In yet another aspect of the present invention, the Master Scheduler is adapted to schedule events where the viewing of an asset, such as graphics, animation, audio, text, video, or any other such digital media, constitutes the event and changes to a primary event causes all supporting events to be updated, as necessary.

Control of different devices and media servers, and hence, assets, is attained by the use of multiple device independent abstraction layers. In accordance with another aspect of the present invention, the Master Scheduler is a central repository of all schedule data and uses different schedule data models for different media servers.

A programmer enters the programming schedule into the Master Scheduler's data models. Once entered the Master Scheduler processes the schedule and creates a number of tasks based on the schedule. Each task is then distributed to a Slave Task Scheduler on the relevant media server for execution at the proper time. The Slave Task Scheduler is adapted to track the tasks given to it, and, prepare media device to send the scheduled information at the appropriate time. When the task is completed, the Slave Task Scheduler notifies the Master Scheduler of its completion so the Master Scheduler can track the status of the task and update its database.

Another advantage to this architecture over the prior art is the use of a heartbeat monitor, which allows Master Scheduler 120 to determine if Slave Task Scheduler 140 is "alive" and if not, to institute recovery procedures.

These and additional objects of this invention can be obtained by reference to the following detailed description of the preferred embodiments thereof in connection with the attached drawings.

BRIEF DESCRIPTION OF THE DRAWINGS

FIGS. 6-22 shows exemplary screen shots of one embodiment of Service Specific GUI 110.

FIGS. 23a, 23b, and 24a-24f show exemplary screen shots of another embodiment of Service Specific GUI 110.

FIGS. 25-28 shows exemplary data models used on one aspect of the present invention.

FIGS. 29-31 shows exemplary tables used in Publish and Subscribe 420 and the result of calls to registered routines.

FIGS. 32a, 32b, 33a and 33b show exemplary embodiments of tables used in the Queue 3200.

DETAILED DESCRIPTION OF THE PREFERRED EMBODIMENTS

Figure 1:
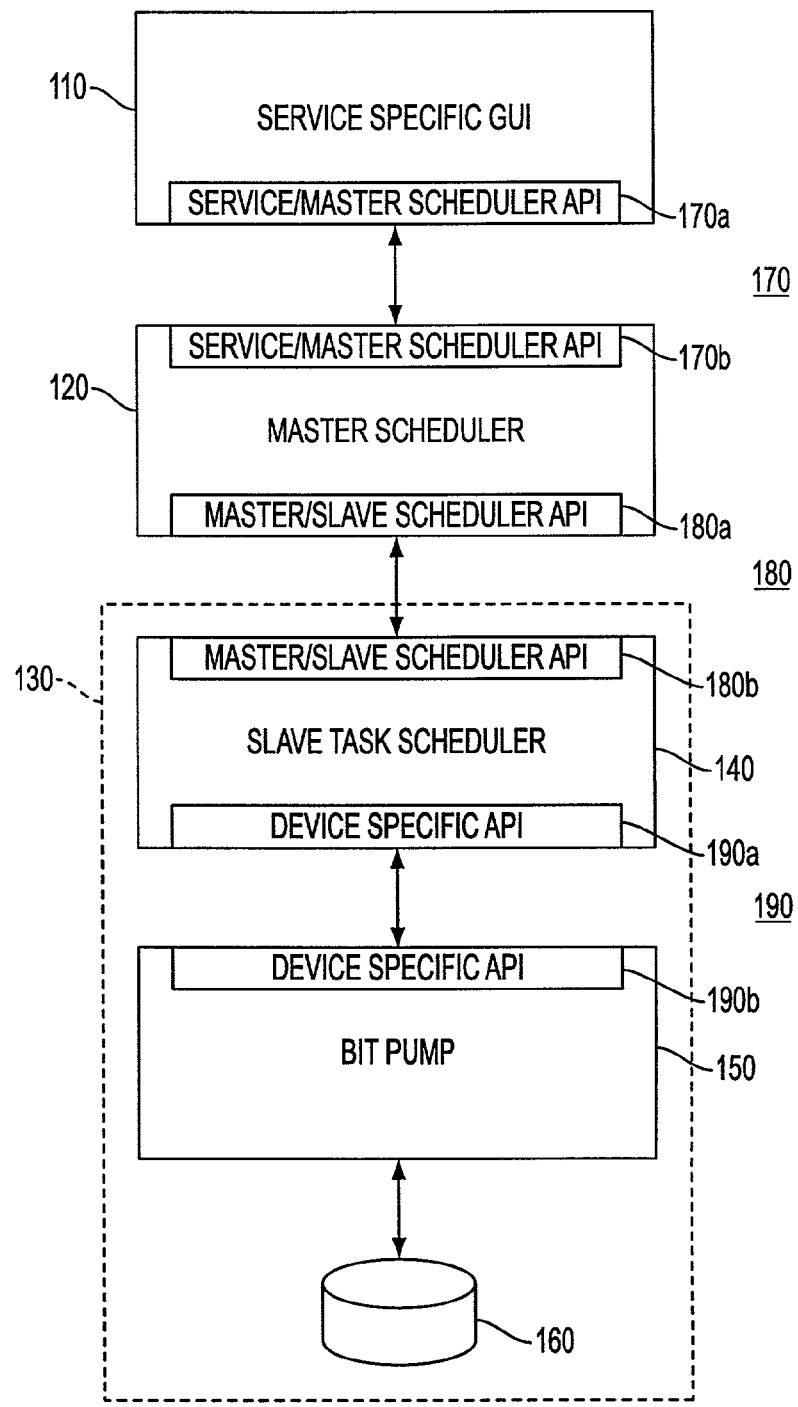
FIG. 1 is a high-level overview of an exemplary embodiment of a system in accordance with one aspect of the invention.

Referring now to FIG. 1, there is shown a system in accordance with one aspect of the invention. In particular, there is shown Service Specific GUI 110 which communicates with Master Scheduler 120 through Service/Master Scheduler API 170. In the preferred embodiment, Service Specific GUI 110 resides on one computer while Master Scheduler 120 resides on a second computer, thus, Service/Master Scheduler API 170 is comprised of two parts, Service/Master Scheduler API 170a which is part of with Service Specific GUI 110 and Service/Master Scheduler API 170b which is part of Master Scheduler 120.

Master Scheduler 120 communicates with Media Server 130 through Master/Slave Scheduler API 180. Media Server 130 is comprised of Slave Task Scheduler 140 which communicates with Master Scheduler 120 through Master/Slave Scheduler API 180 and with Bit pump 150 through Device Specific API 190. Bit pump 150 controls and retrieves data from Storage Device 160, which may be, for instance, a disk, tape, CD-ROM, DVD, or even a server.

The Master/Slave Scheduler API 180 acts as the interface between Master Scheduler 120 a media server's Slave Task Scheduler 140. This API is used by Master Scheduler 120 for, among other things, to distribute, administrate and monitor task and media server availability, heartbeat monitoring, and specific media server control, such as initialization, reset and shutdown. Functions such as heartbeat monitoring, which enables Master Scheduler 120 to ensure that Slave Task Scheduler 140 is alive and operating, allows Master Scheduler 120 to institute a recovery procedure, if necessary.

In the preferred embodiment Master Scheduler 120 communicates with Media Server 130 over a network, and thus Master/Slave Scheduler API 180 is comprise of two parts, Master/Slave Scheduler API 180a and Master/Slave Scheduler API 180b as part of Master Scheduler 120 and Slave Task Scheduler 140, respectively. In another preferred embodiment, Master Scheduler 120 communicates with Media Server 130 using shared memory or a common area of memory. This embodiment allows Master Scheduler 120 to communicate more quickly with Media Server 130 and is also more effective if Master Scheduler 120 and Media Server 130 are in single physical box. Of course, to one skilled in the art, other means of communication may also be used, such as wireless communication techniques.

Slave Task Scheduler 140 can communicate with Bit Pump 150 in a number of different ways, for instance, over a network (LAN, WAN, wired, wireless, optical, RF or otherwise). Since Slave Task Scheduler 140 and Bit Pump 150 may be separate, there is a latency inherent in the system. For example, if Master Scheduler 120 expects Media Server 130 to output a NVOD movie a 8:00 PM, in reality, Slave Task Scheduler 140 must begin sending controls down to Bit Pump 150 at, for instance, 7:59:53 PM. This seven (7) seconds difference, called a delta variable or delta variance, allows time for Slave Task Scheduler 140 to send a command or series of commands over a network to Bit Pump 150 to initialize, retrieve the movie, fill its buffer and begin outputting the requested data by 8:00 PM. Slave Task Scheduler 140 has the appropriate data about the delta variance needed to account for each type of Bit Pump 150 that it may encounter and the interconnections type between it and Bit Pump 150.

In the preferred embodiment, Slave Task Scheduler 140 is incorporated with Bit Pump 150 in one physical case, and thus a traditional network is not needed. Instead, Slave Task Scheduler 140 communicates with Bit Pump 150 using well known techniques of shared memory. This embodiment allows for faster access and reduces the delta variance required for Bit Pump 150 to prepare for and begin retrieving and sending out data.

Device Specific API 190 is comprised of two parts, Device Specific API 190a as part of Slave Task Scheduler 140 and Device Specific API 190b as part of Bit Pump 150.

A programmer uses Service Specific GUI 110 for creating a schedule. Prior creating a schedule services are created. A service is a relationship between a primary event and supporting events. A primary event is an event that a viewer can select from the EPG. A supporting event is an event that is subsidiary to the primary event and provides a viewer with additional multimedia data enhancing the primary event. A broadcast service may be defined, for instance has a primary event with two supporting services—text captions and Internet facts. Once defined, Service Specific GUI 110 is able to use the service definition to constrain the choices made by a programmer to ensure that the desired supporting events are available. For instance, if the primary event is a broadcast show, i.e., a broadcast event and the programmer wants, for instance, to provide additional text information about the broadcast event from a data carousel and other facts from the Internet, then there would also be two supporting events—a text caption event and an Internet facts event. Both of these events are supporting events, while the data carousel and the system which obtains the Internet facts would be the supporting services.

The relationship between a primary event and a supporting event may be thought of, in graph theory, as an inverted tree where the primary event is a high level node that is visible and selectable by the consumer, while supporting events are either additional nodes or leaves under such node. A service is thus the set of nodes that can be under a particular type of node. Using the above example, for the broadcast service, a broadcast event node can only have a data carousel for text information and/or Internet material for supporting events. The broadcast event node would thus be the root node and, at most, two leaves (assuming no supporting services for the supporting events) under that root node. If the data carousel is in turn supported by other events, then the data carousel service would not be a leaf, but is itself a node, and would have other leaves under such node.

In the preferred embodiment, the programmer uses a graphical user interface, although other types interfaces, including non-graphical interfaces, may also be used. Moreover, Service Specific GUI 110 may be specifically tailored for particular types of program services, such as broadcast, pay-for-view movies, restricted access, public service and children's programming, although one GUI may suffice for all desired services.

Master Scheduler 120 processes the schedule created by the programmer using Service Specific GUI 110 and generates tasks. Tasks are commands which instruct Media Server 130 to perform an action, such as Initialize or Play. These tasks are then distributed to Slave Task Scheduler 140 in Media Server 130. In accordance with one aspect of the invention, tasks can be distributed months, even years ahead of schedule. Alternatively the tasks can be distributed in "real-time," as long as the distribution is sufficiently prior to the scheduled task to permit Slave Task Scheduler 140 to account for any delta variance.

Moreover, in accordance with another aspect of the invention, the distributed nature of the Master Scheduler 120 from the Media Server 130 and the ability to distribute and have tasks executed independently of Master Scheduler 120 provides the benefit of allowing for recovery in the event of a failure in a media server, thereby providing a degree of fault tolerance to system failures. In particular, Master Scheduler 120 monitors the heartbeat from each media server. The heartbeat is, in its simplest form, a signal from a media server indicating to the Master Scheduler 120 that it is alive and functioning. Master Scheduler 120 can determine from the heartbeat when a media server goes down, and can quickly reassign tasks to other media servers or backup media servers as necessary. When the media server has been brought back up, its heartbeat will provide an indication of this to Master Scheduler 120, which can then reassign to it any of its original unexpired tasks.

At the appropriate time, Slave Task Scheduler 140 executes the task by issuing a device specific command or series of device specific commands to Bit Pump 150. Bit Pump 150 responds to the device specific commands by, for example retrieving the data from Storage Device 160.

Figure 2:
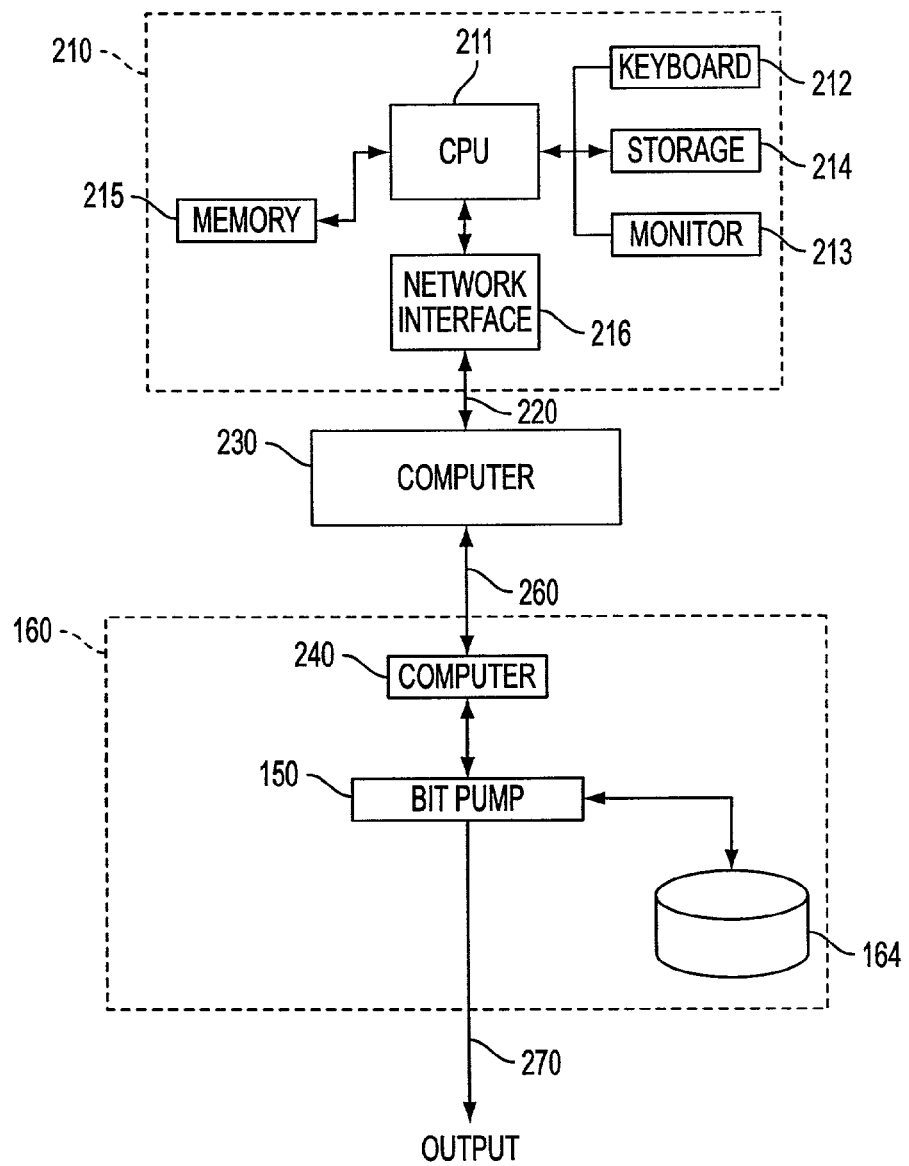
FIG. 2 is a block diagram depicting the compute implementation of the invention is a system such as that shown in FIG. 1.

Referring now to FIG. 2, there is shown a Computer 210 which executes the code for Service Specific GUI 110. In particular, Computer 210 is, as an exemplary embodiment, comprised of CPU 211 which interacts with Keyboard 212, Monitor 213, Storage 214, Memory 215 and Network Interface 216 and operates in a manner well known to those skilled in the art. Although shown in FIG. 2 as a single processor system, Computer 210 is not limited to this embodiment and may be, for instance, a multiprocessor system, mainframe, or even a client/server system. Similarly, Computer 230 and 240 runs the code for Master Scheduler 120 and Slave Task Scheduler 140, respectively. The details of Computer 230 and 240 are likewise well-known to those skilled in the art an may be similar to those computer systems described for Computer 210. Bit Pump 150, upon receipt of device specific command performs the request action, and, if requested to retrieve data, sends that data over Network 270.

In the preferred embodiment, Computer 210 communicates with Computer 230 via Network 220 and Computer 230 communicates with Computer 240 via Network 260. As can be appreciated by one skill in the art, Network 220, 260 and 270 do not have to be separate independent networks and may, as an example, be a single network where Computers 210, 230 and 240 are simply nodes on that single network. Network 220, 260 and 270 may, for instance, be a LAN, WAN or even a VPN over the Internet and be physically connected or connected wirelessly.

Figure 3A:
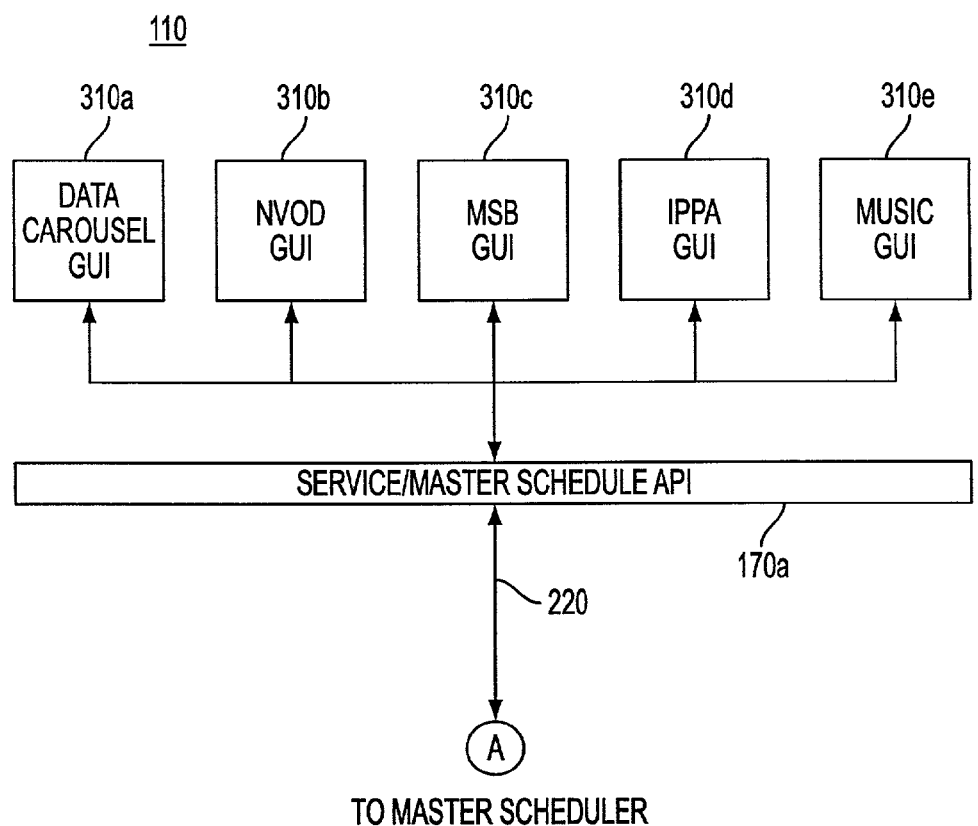
FIG. 3a shows an exemplary embodiment of Service Specific GUI 110.

Referring now to FIG. 3a there is shown a more detailed diagram of Service Specific GUI 110. In particular, different supporting services may be addressed and scheduled in different ways. For instance, a data carousel has different specification and information than a NVOD device, which in turn has different specifications than a multiscreen browser service or a music server. Accordingly, different GUIs are available for each of the different supporting services. These are represented by, but are not limited to, Data Carousel GUI 310a, NVOD GUI 310b, MSB GUI 310c, IPPA GUI 310d and Music GUI 310e.

A data carousel media server is a device that provides multiple streams of data, where each stream of data is identified by a process ID ("PID") and where each such stream stores or references data in a number of logical slots. The data carousel then cyclically cycles through the slots for each PID and transmits the data stored or referenced in those slots. A NVOD media server (Near Video On Demand) has the ability to retrieve and play a number of different videos on different channels. A MSB media server (Multi-Screen Browser) is a device that is designed to take a number of video streams, for example, a number of broadcast channels, and display them concurrently on one television screen. The screen may be divided into a number of windows, with each stream displayed in reduced format in a separate window. An IPPA media server (Internet Push Pull Agent) is a device that is connected to the Internet and can transmit information from a service such as Pointcast or can retrieve information from an Internet or internal site. A Music media server is a device that transmits music on one or more channels. These devices are only examples of different types of media servers that may be used in accordance with this invention and there are other types of devices such as channel management devices that may also be used.

Of course, scheduling these different services do not have to be through separate independent GUIs. In the preferred embodiment, these supporting services are accessible through a single master GUI, with additional details of each supporting service displayed as needed. The user creates the schedule using Service Specific GUI 110, which communicates with Master Scheduler 120 through Service/Master Scheduler API 170*a*.

Figure 3B:
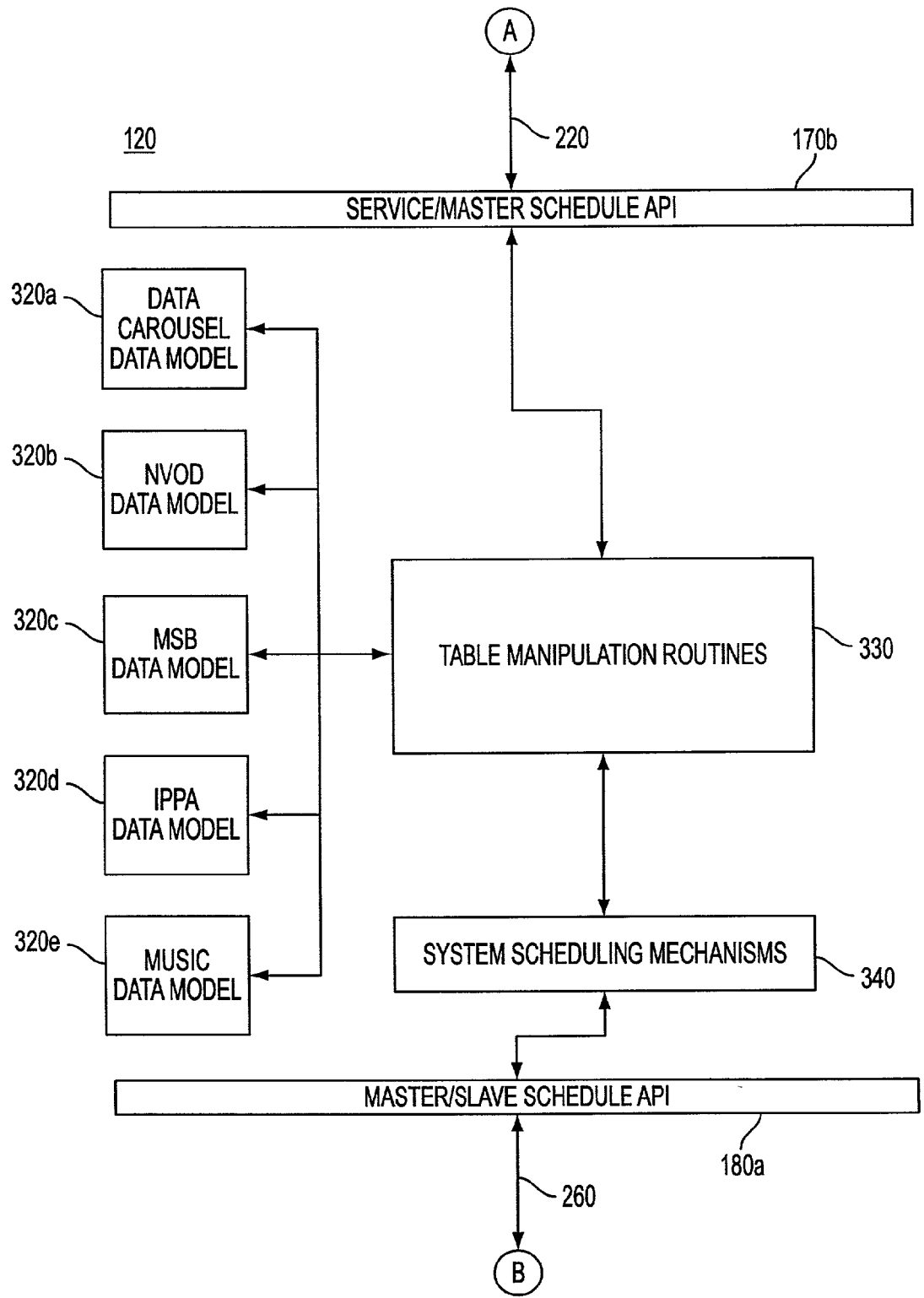
FIG. 3b shows an exemplary embodiment of Master Scheduler 120.

Referring now to FIG. 3*b*, there is shown a more detailed diagram of Master Scheduler 120. In particular, Service Specific GUI 110 communicates with Table Manipulation Routines 330 to add and manipulate events, as needed, in the relevant data models. More specifically, the data pertaining to events for a particular service, primary or supporting, is stored in a set of tables. The set of tables for a particular service is called a data model, as exemplified by Data Models 320*a-e*. Each data model is generally tailored to specific service, although a single data model may be used for different services. For example, a data model for a data carousel service may require a specification of the loop cycle of the data carousel, number of slots and data storage size of slots. In such a case Data Carousel Data Model 320 may include data pertaining to the loop cycle of the data carousel, slots, data storage size of each slot and the data model may hold data and packet information. Of course, other information may be required or included in the tables, as determined by the needs of the service. In the preferred embodiment, the data models are object-based and an object-oriented database is used.

As an exemplary embodiment, there is shown Data Carousel Data Model 320*a*, NVOD Data Model 320*b*, MSB Data Model 320*c*, IPPA Data Model 320*d* and Music Data Model 320*c*, which correspond to different supporting services scheduled using Data Carousel GUI 310*a*, NVOD GUI 310*b*, MSB GUI 310*c*, IPPA GUI 310*d* and Music GUI 310*e*, respectively. It is not required, however, that each service has its own data model. In some instances where the services are similar, a single data model may be used for a number of different services.

Table Manipulation Routines 330 provide a means for Service Specific GUI 110 and other processes, such as System Scheduling Mechanisms 340, to create, store, retrieve and remove event data from the Data Models 320*a-e* (and any other data models). Usually there are different routines for different Data Models since the data tables tend to be different for each service and hence data model. In the preferred embodiment additional routines may be designed, constructed and added to Table Manipulation Routines 330 to provide increased flexibility and expandability in the system. Alternatively, the different routines may be simplified and abstracted at higher levels to provide a set of generic APIs to include in the Service/Master Scheduler API 170 to minimize the need to construct new and different routines for Table Manipulation Routines 330 for each Service Specific GUI 110.

Table 1, below, shows exemplary Table Manipulation Routines in the preferred embodiment which may be used to manipulate various data models.

TABLE 1

| Routine | Type | Comment |
| --- | --- | --- |
| Tmr_CreateDM | Generic | Creates an instance of a data model |
| Tmr_DefineDMTables | Generic | Defines the set of tables of the data model |
| Tmr_DefineTableField | Generic | Adds a field to a table definition |
| Tmr_CreateTableEntryInstance | Generic and/or Specific | Populates an entry into a data model table. |
| Tmr_ImportDMData | Generic | Imports data from an external data model |
| Tmr_ExportDMData | Generic | Exports data model local data |
| Tmr_DefineSched | Generic | Schedule data may be spread across several tables. This routine creates a virtual schedule table. Note: It is possible to have different types of schedules within the same data model by defining different schedule tables. |
| Tmr_DefineSchedField | Generic | Defines a field to be added to a virtual schedule table. |
| Tmr_CreateSchedInstance | Specific | Populates an instance of a schedule table. This routine is specific to a data model. |
| Tmr_TransSchedToTask | Specific | Translates an instantiated and populated schedule into a task. |
| Tmr_DistributeTask | Generic | Distributes a task to a specific Task Scheduler or Media Server |
| Tmr_MonitorSched | Generic | Reports on the status of a particular schedule |
| Tmr_SetTimer | Generic | Sets a timer trigger |
| Tmr_RemoveTimer | Generic | Removes a timer trigger |
| Tmr_RegisterEvent | Generic | Creates a new event |
| Tmr_RegisterEventInterest | Generic | Registers interest in a specific event. |
| Tmr_LogEvent | Generic | Logs the occurrence of a specific event. |

The routines shown in Table 1 are not exhaustive and other routines not shown may be added such as routines for the deletion of schedule instances, removal of fields in the tables of a data model, etc. These Table Manipulation Routines may search for data using SQL (Structured Query Language) search procedure or any other form of database control command to control a database, such as an object-oriented or relational database engine.

Scheduling System Mechanisms 340 are routines/mechanisms common to the scheduling of events task and accesses the data models by Table Manipulation Routines 330. Exemplary mechanisms may include, timers, event publishers and subscriber interfaces, distribution of tasks (which in the preferred embodiment does not transform a task into a schedule). Scheduling System Mechanisms 340 also perform the function of generating tasks from a schedule. These tasks are then distributed to Slave Task Scheduler 140 through Master/Slave Scheduler API 180.

Figure 3C:
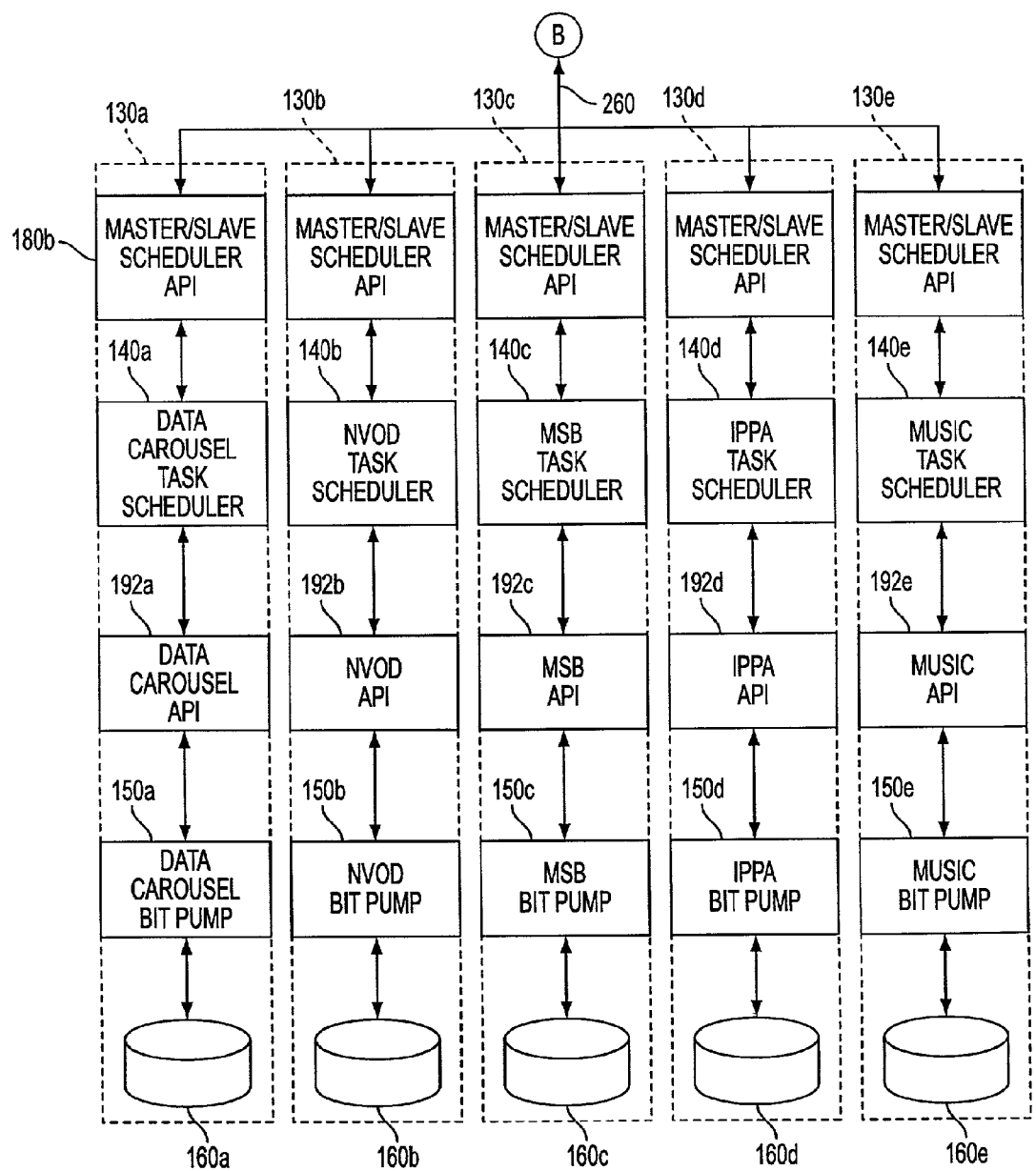
FIG. 3c shows an exemplary embodiment of Media Server 130.

Referring now to FIG. 3c there is shown a more detailed diagram of Media Server 130. Specifically, there is shown a number of Media Servers 130a-e. Media Servers 130 a-e is comprised of Master/Slave Scheduler API 180b, Task Schedulers 140a-e, Device Specific APIs 192a-e, Bit Pumps 150a-e and Storage Devices 160a-e, respectively. Using Media Server 130a as an exemplary illustration, Data Carousel Task Scheduler 140a receives a task from Master Scheduler 120 via Master/Slave Scheduler API 180b. At the appropriate time, Data Carousel 140a processes the task into device specific commands, in this example, data carousel commands and sends those commands via Data Carousel API 192a to Data Carousel Bit Pump 150a, which performs the requested commands and, if necessary, interacts with Storage Device 160a. The other Media Servers 130b-e generally operate in a similar manner.

Figure 4A:
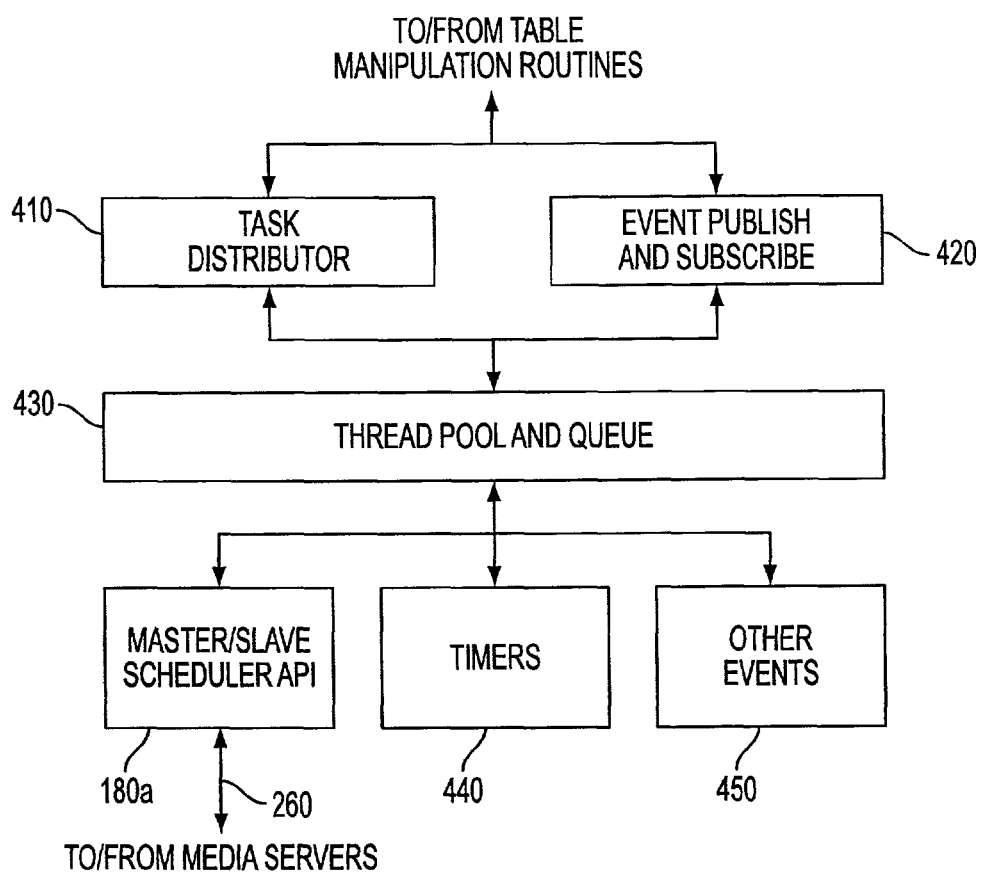
FIGS. 4a and 4b show exemplary embodiments of System Scheduling Mechanism 340.

Referring now to FIG. 4a there is shown a more detailed diagram of System Scheduling Mechanisms 340 for one embodiment. In particular, there is shown Task Distributor 410 which communicates with Table Manipulation Routines 330, Event Publish and Subscribe 420 and Thread Pool and Queue 430. Event Publish and Subscribe 420 provides a mechanism to update the data models and communicates with Thread Pool and Queue 430, which in turn also communicates with Master/Slave Scheduler API 180a, Timers 440 and Other Events 450.

In operation, Thread Pool and Queue 430 and Event Publish and Subscribe 420 form the core of Scheduling System Mechanism 340. Threads are use by different parts of the system to perform various computations, functions and tracking. For instance, once a schedule is created, Task Distributor 410 transforms the schedule into a series of tasks and assigns the task to a thread and places the thread in Thread Pool and Queue 430. At the appropriate time, the thread may issue a command via the Master/Slave Scheduler API 180a to Media Server 130 using some network communication mechanism. In the preferred embodiment, that communication mechanism is CORBA, although other methods, such as a remote procedure call ("RPC") may be used. The thread then blocks, waiting for a response. Upon receipt of the response, the original thread unblocks and returns control to the caller, in this case the Thread Pool and Queue 430.

In the case of the receipt of a message from, for instance a media server, expiration of a timer, or other platform event, the thread is allocated and carries the event notification to into a queue in Thread Pool and Queue 430. For example, the notification of a task transitioning from "installed" to "executing" status is captured and transported by the thread to a predetermined queue. As soon as the notification is dropped into the queue, the thread returns a message to the original sender indicating the status of the requested operation.

The publish and subscribe mechanism of Event Publish and Subscribe 420 allows routines to register interest in a particular event, causing the routine to be notified when the event has arrived. Using a publish and subscribe mechanism thus allows for specific and selective propagation of information to supporting events when the primary event has changed. In one embodiment, the primary events are published, that is registered so that the system can keep track of those events that may affect other events. A consequent change causes the subscribing mechanism to determine what events are to be modified and what procedures to use in such modification. The result is that changing one event can easily propagate changes and updates to other related events.

Figure 4B:
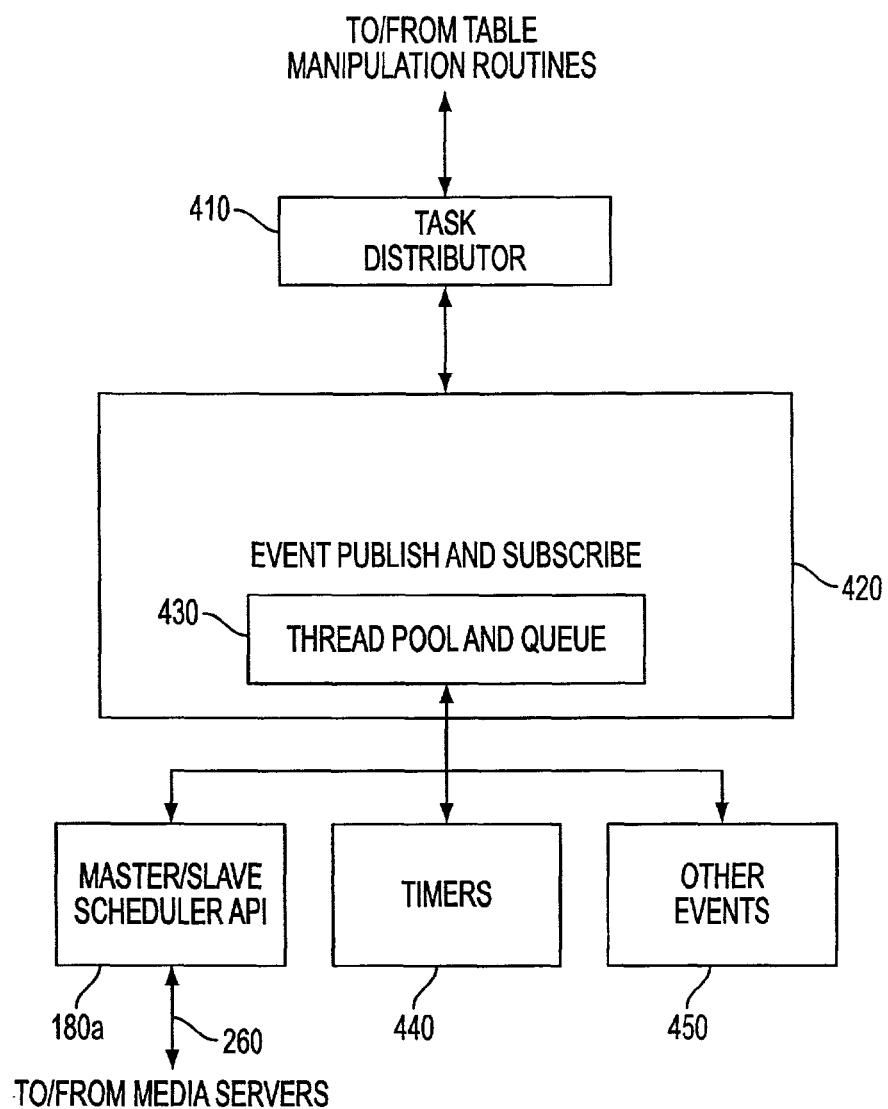

FIG. 4b discloses a second, and preferred, embodiment where Thread Pool and Queue 430 is an integral part of Event Publish and Subscribe 420. In this embodiment, events are registered in the Thread Pool and Queue 430 through Event Publish and Subscribe 420. Preferably, all events are registered, to provided a means for tracking the status of tasks. For instance, when a task has successfully executed, a message may be sent to Event Publish and Subscribe 420 to execute certain routines based on the receipt of that message.

In accordance with one aspect of the present invention, Master/Slave Scheduler API 130 allows Master Scheduler 120 to deal only with the issues of scheduling and the translation of schedules into tasks without having to account for media server specific issues, unlike prior art schedulers. In the preferred embodiment, the Master/Slave Scheduler API 130 is a synchronous protocol for distributing to and managing tasks in remote media servers. The protocol is synchronous (i.e., the blocking of API calls is allowed as long as it is coupled with a time-out and reissue protocol policy) because it is expected that network traffic is low and that inherent latencies are tolerable. Table 2 sets forth one embodiment of the Master/Slave Scheduler API 130.

It is assumed in the preferred embodiment that CORBA's IIOP is used for the passing of messages, but is not limited to the use of IIOP. Other protocols may of course be used, such as TCP/IP, and the selection of such other protocols is not important to practicing this invention. In addition, all events within a Master Scheduler should be unique and identified by a MasterId. This permits Multiple Master Schedulers, each with its own identifier, to co-exist as long a each event is uniquely identified by a combination of its MasterId and EventId. Multiple Master Scheduler may take the form, for instance of, of having east and west coast Master Schedulers, each with its own local scheduler, but together there is a single, albeit distributed, schedule. Tasks should also carry the same Id from which it was derived (and likewise, the same unique combination of Master Scheduler Id and EventId if multiple Master Scheduler's are used). In the preferred embodiment tasks have the form of a tuple [taskId, assestList, operator, time, data]. AssetList is a list of assets over which the operation identified by operator is performed at the time. Data is used for data used to support operator. As previously discussed, a synchronous protocol with a blocking RPC mechanism is preferred, although other synchronous protocols may be used. For simplicity, if a schedule's time has expired, the preferred embodiment automatically deletes that schedule.

TABLE 2

| Message | Function | Fields | Return Value | Comments |
|---|---|---|---|---|
| Ms_installTask | Installs a task in a slave scheduler | IN:<br>MasterId<br>SlaveId<br>TaskId<br><notifySw><br>{taskData} | msSUCCEED<br>msFAIL | The notifySw [on, off] indicates whether the slave should notify the status of the task whenever it changes state. Specific task data is transported by taskData and will vary depending on the type of task. E.g. time, date, asset list, operation, stream number. Note: Tasks that have expired (i.e. their execution time is past the current time) can not be installed. |
| Ms_ModifyTask | Modifies the data of a task installed in a slave scheduler | IN:<br>MasterId<br>SlaveId<br>TaskId<br>{schedData} | msSUCCEED<br>msFAIL | Specific task data is transported by taskData and will vary depending on the type of schedule. E.g. time, date, asset list, operation, stream number. It will replace the pre-existent task data. |
| Ms_RemoveTask | Removes a task from a slave scheduler | IN:<br>mastereId<br>slaveId<br>taskId | msSUCCEED<br>msFAIL | Removes taskId from the salve scheduler timeline. If the task has expired in the slave it is automatically removed. |
| Ms_TaskImage | Retrieves a list of tasks installed in a media server | IN:<br>masterId<br>slaveId<br>{taskIdList}<br>OUT: {tasks} | msSUCCEED<br>msFAIL | Retrieves a set of tasks from a task scheduler, including all the supporting data. Hence, {tasks} is composed of tuples of the form [taskId, assetList, operator, time, data]. |
| Ms_MonitorTask | Monitor the status of a task executed by a slave scheduler | IN:<br>masterId<br>slaveId<br>taskId<br><monitorSw> | msSUCCEED<br>msFAIL | This message instructs the slave to send a notification every time the state of taskId changes. E.g. when the task is inactive and changes to executing, when it finishes, if an when it encounters and error condition, etc. The monitorSw [on, off] turns monitoring on or off. |
| Ms_MonitorSlave | Monitor the status of a particular slave scheduler | IN:<br>masterId<br>slaveId<br>secs<br><monitorSw> | msSUCCEED<br>msFAIL | Used to set a heartbeat every secs of time, to guarantee the sanity of a slave scheduler. The monitorSw [on, off] turns monitoring on or off. |
| Ss_TaskStatus | Notifies the Master Scheduler about a change in the status of a task | IN:<br>masterId<br>slaveId<br>taskId<br><taskStatus><br>{statusData} | msSUCCEED<br>msFAIL | The new state of the schedule is sent via taskStatus [installed, waiting, executing, completed, removed, error1, . . . , errorN], which indicates the new state just entered. The field statusData holds data resulting from the change of state of the schedule. E.g. a call collector returning billing information as a consequence of the completion of a call task. |
| Ss_HeartBeat | Notifies the Master that the slave scheduler is alive and well | IN:<br>slaveId<br>mastered<br><slaveStatus> | msSUCCEED<br>msFAIL | The heartbeat message is sent every time period to the master, with a slaveStatus [normal, alarm1, . . . , alarmN]. Note: The heartbeat is really a cross-tier function and should be an SNMP level service. |

TABLE 2-continued

| Message | Function | Fields | Return Value | Comments |
|---|---|---|---|---|
| Ss_TaskChange | Notifies the Master Scheduler about a change in the task data | IN: slaveId masterId taskId {taskData} | msSUCCEED msFAIL | Schedule data may be changed manually, which would create and inconsistency between the slave and the master. This message notifies the master that synchronization of the master and slave data is required, with taskData being the current data. |
| Ms_SyncSlaveClock | Synchronizes the slave scheduler clock with the Master Scheduler clock | IN: mastereId slaveId syncTime | msSUCCEED msFAIL | The syncTime is a structure composed of the timeZone, date and time, the latter expressed in seconds. The timeZone [GMT0, . . . , GMTN] is used for locality. It is used to synchronize the clocks of the slaves with the master scheduler clock. Note: This is a soft clock sync function. A hardware clock sync is highly recommended as there is some inherent clock drift in this approach. |
| Ss_GetMasterClock | Get a clock value from the Master Scheduler to synchronize the local slave clock | IN: slaveId mastered OUT: syncTime | msSUCCEED msFAIL | Returns a syncTime structure containing the current master clock time. Note: This is a soft clock sync function. A hardware clock sync is highly recommended as there is some inherent clock drift in this approach. |
| Ms_ControlSlave | Issues a control instruction specific to a slave device | slaveId masterId {slaveControl} | msSUCCEED msFAIL | Control of specific features of slave devices may demand control calls that are specific to the slave device. E.g. a NVOD server may require an emergency procedure to restart the system or change output ports for a stream. A series of Ms_ControlSlave messages containing slaveControl instructions (specific to a slave device) can achieve such specific need. Note: This API message is used to code emergency procedures and specific setup and teardown procedures (such as initialization) for the specific devices. |

{and} denote a list of items.
<and> denote an enumerated set of values.
The suffix Sw denotes a variable used as a switch with values [on, off].
Ids are 64-bit integers.
A prefix of Ms (for Master Scheduler) indicates messages flowing from the Master Scheduler towards a Slave Task Scheduler.
A prefix of Ss (for Slave Scheduler) indicates messages flowing from the Slave Task Scheduler to the Master Scheduler.

Figure 5:
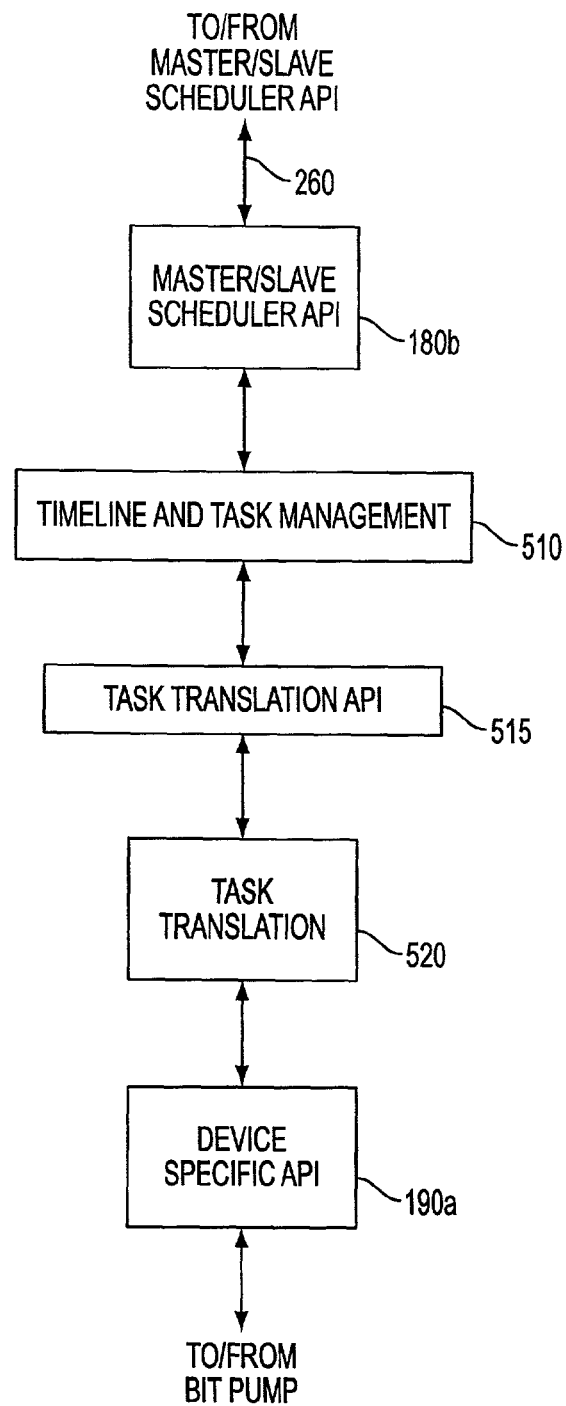
FIG. 5 shows an exemplary embodiment of Slave Task Scheduler 140.

Referring now to FIG. 5, there is shown a more detailed diagram of Slave Task Scheduler 140. Specifically, Master/Slave Scheduler API 180b denotes that portion of the Master/Slave Scheduler API 130 that resided in Slave Task Scheduler 135. It sends and receives Master/Slave Scheduler API 130a messages and passes those message to Timeline and Task Management 510. Timeline and Task Management 510 process the messages, manipulates the timeline, and where appropriate, executes the task by sending the task to Task Translation Layer 520. Translation Layer 520 translates the task into a form to send to Bit Pump 150 via Device Specific API 190a. In the preferred embodiment Master/Slave Scheduler API 180 and Timeline and Task Management 510 are device independent while Task Translation 520 and Device Specific API 190 are device dependent.

In the preferred embodiment, Task Translation Layer 520 communicates with Timeline and Task Management 510 via Task Translation API 515, shown in Table 3.

TABLE 3

| MESSAGE | FUNCTION | FIELDS | RETURN VALUE | COMMENTS |
|---|---|---|---|---|
| Tt_TaskInit | Initialize the Task Translation Layer and the device | OUT: OpStatus | TtSUCCEED ttFAIL | Initializes Task Translation Layer 420 and the Media Server controlled by it. OpStatus conveys the result of the initialization procedure. |
| Tt_Task | Execute a task | IN: TaskId <assetlist> operator. <op_spec_data> OUT: OpStatus | TtSUCCEED TtFAIL | taskId identifies a task that is to be executed immediately. <asset list> denotes a list of physical names. In the NVOD server case, <asset_list> is equivalent to play list. <op_spec_clata> is a variable length list used to transport device dependent information necessary to carry out the operation. The valid values for operator are (in the NVOD server case): ttPLAY, ttPAUSE, ttABORT. |
| Ms_TaskStatus | Callback returning a task status | IN: TaskIdStatus StatusText OUT: OpStatus | TtSUCCEED TtFAIL | status has one of the following values: ttLOADED, ttEXECUTING, ttCOMPLETED, ttERROR. StatusText is used to further specify the nature of error. • |

For every task to be executed, Task Translation Layer 520 creates an instance of a finite state machine (FSM) to track the state transitions of the task as it is carried out to completion by the media server. The FSM instance is identified by the tasked of the task being tracked.

The state set of a FSM instance contains at least one state for each status value. Generic states for all media servers include states for ttLOADED, ttEXECUTING, ttCOMPLETED, and ttERROR. Take for instance, an Associated Press video server. The status ttLOADED from the video media server indicates that the task is loaded, queued and awaiting executing. If offline, then a error message, ttERROR, is generated with the specifics of the error in the payload and sent back to Master Scheduler 120.

Figure 6:
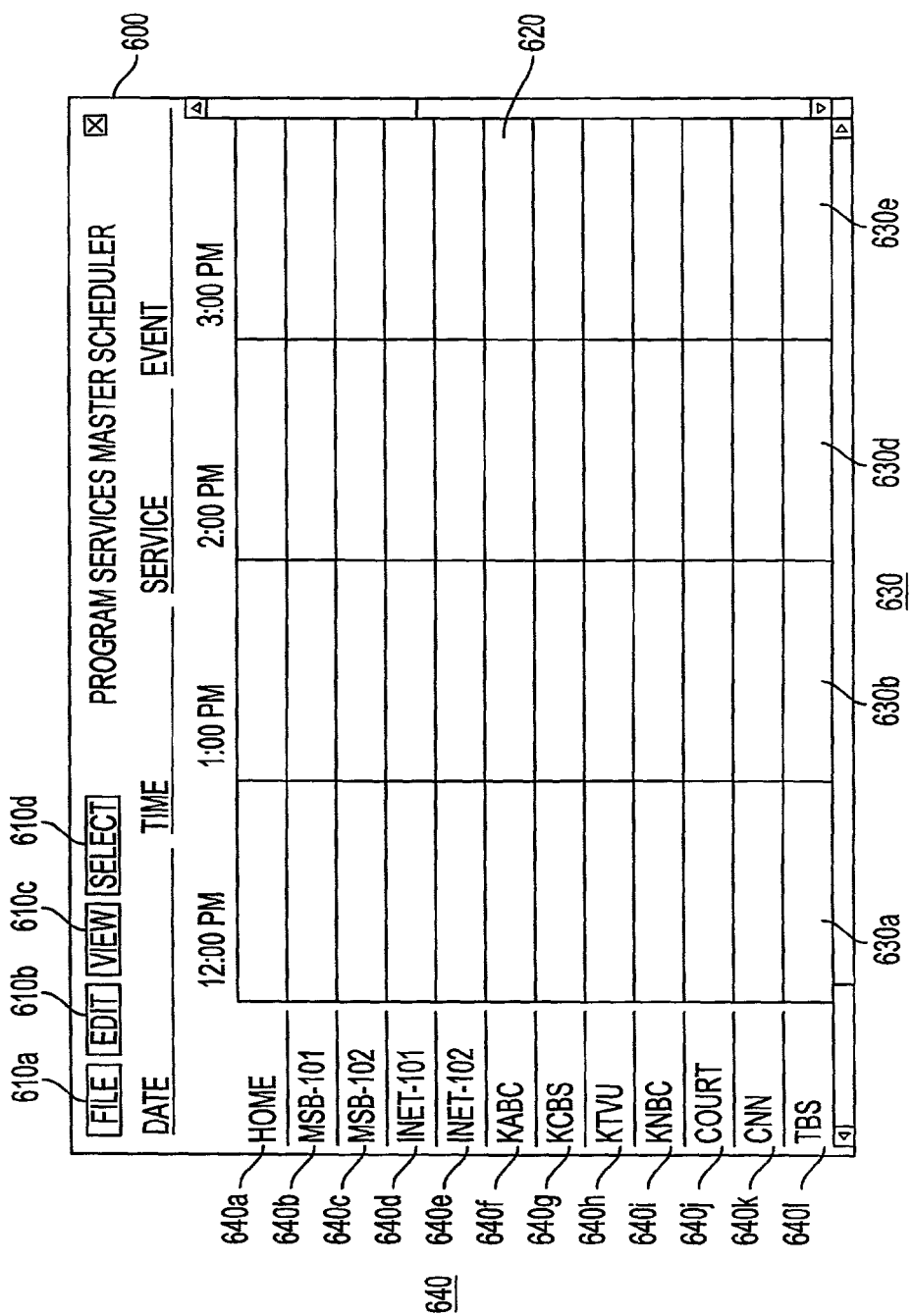
Figure 34:
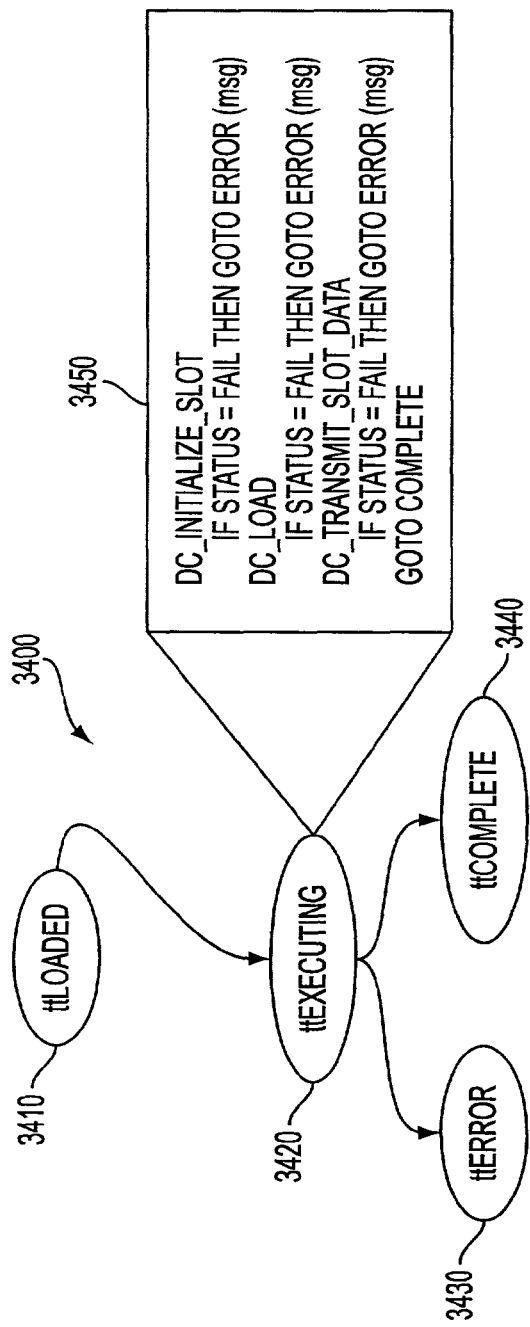
FIG. 34 shows one aspect of a finite state machine and four states.

Of course, other states and status may be used. Another embodiment is also shown in FIG. 34. For example, a FSM to track the status of a NVOD server operation has the status value states and may have others to account for intermediate operations such as:

Opening a session
Opening a stream
Playing a stream
Closing the stream
Closing the session Tuple operators for other types of media servers, which in turn may be translated into device specific API calls, are as follows:

Data Carousel: ttINTERLEAVE, ttNEW_DELIVERY_LIST, ttSTART, ttSTOP, ttREMOVE
MSB: ttNEW_CHANNEL_LINEUP, ttSTART, ttSTOP Reference is now made to FIG. 6 which shows exemplary screen shots of Service Specific GUI 110. In particular, there is shown Screen 600 which consists of Control Buttons 610*a*, 610*b*, 610*c* and 610*d*. These Control Button allow a user to control various functions of the exemplary system. Screen 600 is further comprised of Schedule Array 620 arranged as a 'series of Time Columns 630*a*-630*d* and a series of Program Rows 640*a*-6401. Time Columns 630 represent one hour intervals in this example and Program Rows 640 represent the program listings for a number of channels. The intersection of the Time Columns 630 and Program Rows 640 comprise Cells 622 in Schedule Array 620. Although the cells shown are in equal time intervals, other ways may be shown for unequal time intervals. For instance, to indicate a two-hour show, a cell spanning the length of two one-hour cells, representing a two hour time interval may be used. In another embodiment, each cell may be the same, but the second cell in a two-hour time interval may be a different color to indicate that that time slot is unavailable. In the preferred embodiment the time interval displayed may be modified to suit the users needs, such as by one-half hour intervals rather than by one hour intervals and the way varying time slots are shown may also be selected and modified.

Figure 7:
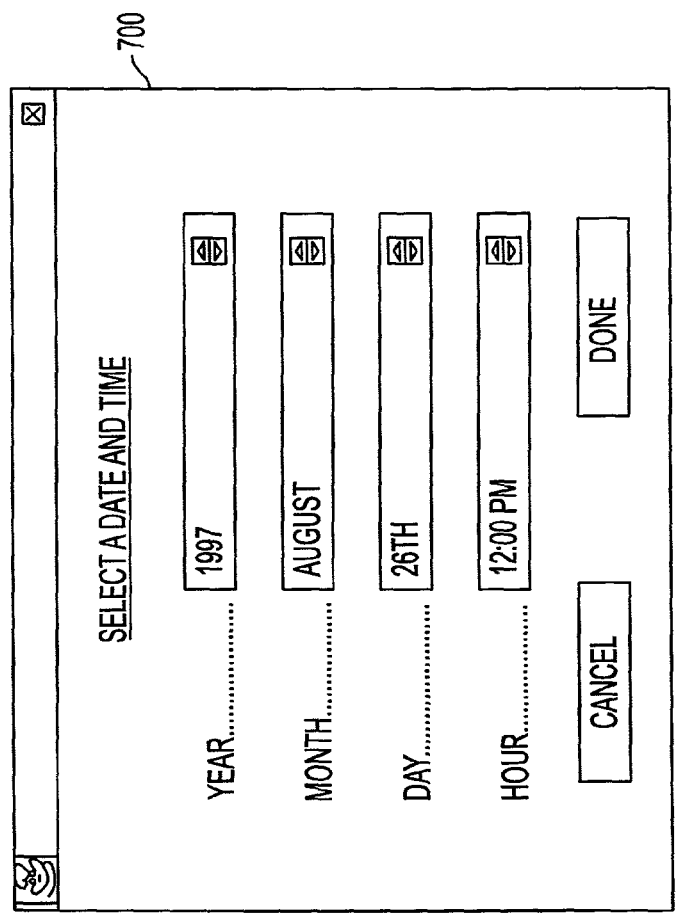

FIG. 7 show an exemplary dialog box when Control Button 610*d* is select. Dialog Box 700 allows the user to enter a date that the user would like to view the schedule from. In this example, the user has entered Aug. 26, 1997 and 12:00 PM.

Figure 8:
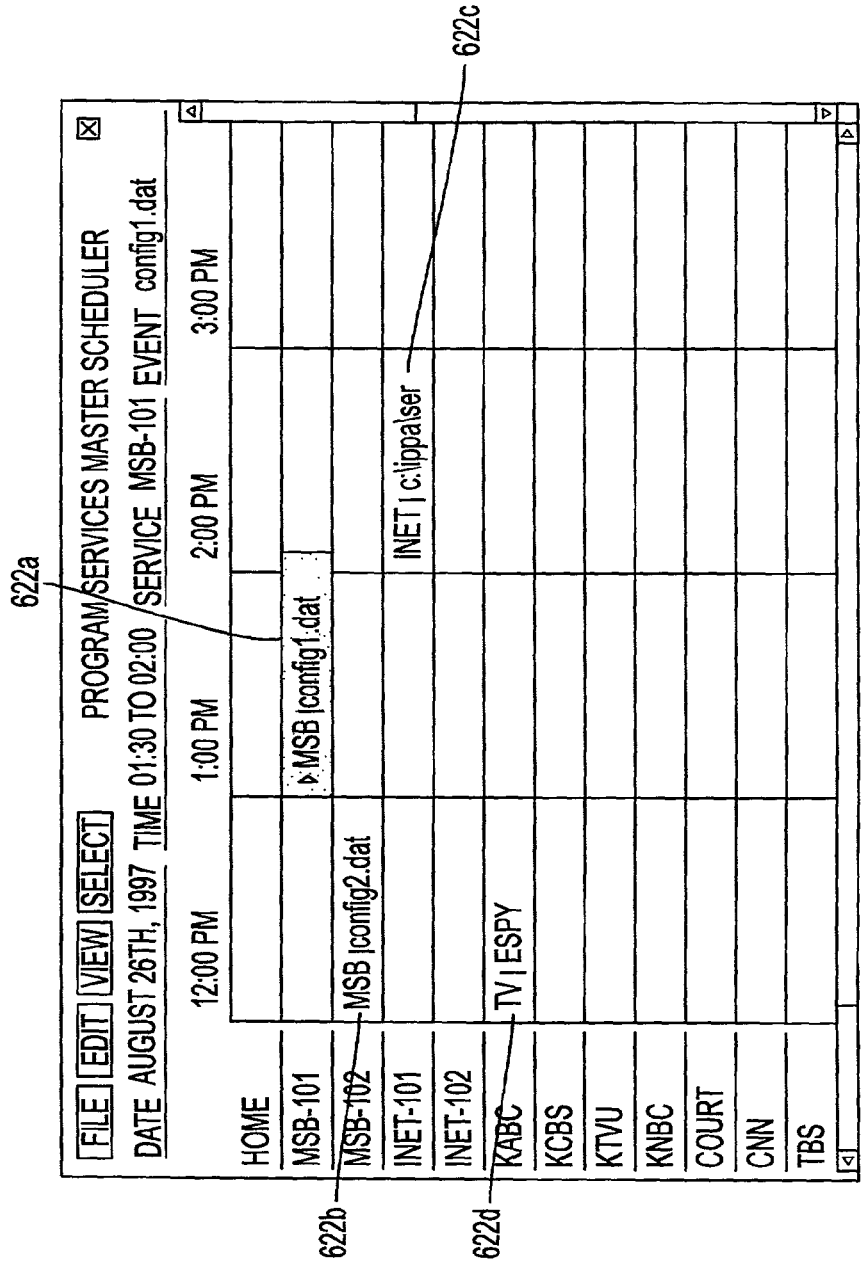

FIG. 8 shows an example of the results of selecting Control Button 610*d* where the date of Aug. 26, 1997, and the start time of 12:00 AM has been entered. In particular Cells 622*a-d* show four primary events scheduled. Cell 622*a* shows that a multi-screen browser channel, MSB-101, has scheduled at 1:00 pm the primary event, and that the location of where to obtain the event is detailed in a filed called "config1.dat." Cell 622*b* shows a second multi-screen browser channel, MSB-102, has scheduled at 12:00 pm primary event, and that the location of where to obtain the event is detailed in a filed called "config2.dat." Cell 622*c* indicates that an Internet channel, IIET-101 is to display at 2:00 pm, and that the information, such as the web site URL, is identified in the data from the listed file. Cell 622*d* shows a standard broadcast channel, KABC, has a sports event scheduled for 12:00 pm, and that the event is a TV event, with a program name ESPY. In FIG. 8, Cell 622*a* is selected.

Figure 9:
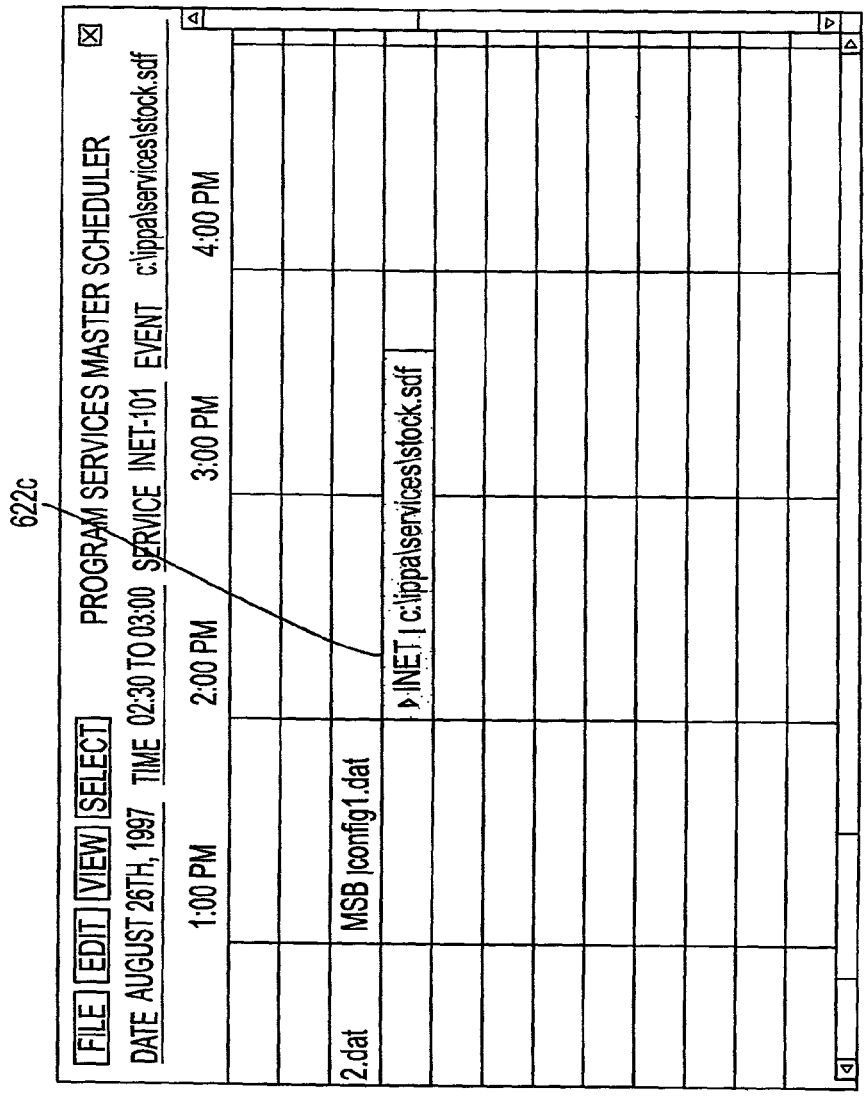

FIG. 9 shows the screen shot of FIG. 8 with Cell 622*c* selected. When selected, the full name of the primary event is shown, in this example, the web site URL is identified in the data from the data file "stocks.sdf."

FIG. 10 shows Cell 622*d* selected. The information is displayed as Primary Event 1001 and the triangle icon on the left of the indicates that there are one or more supporting events below it that can be selected. This format is also shown in FIGS. 8 and 9 in cells 622*a* and 622*c*, respectively.

Figure 11:
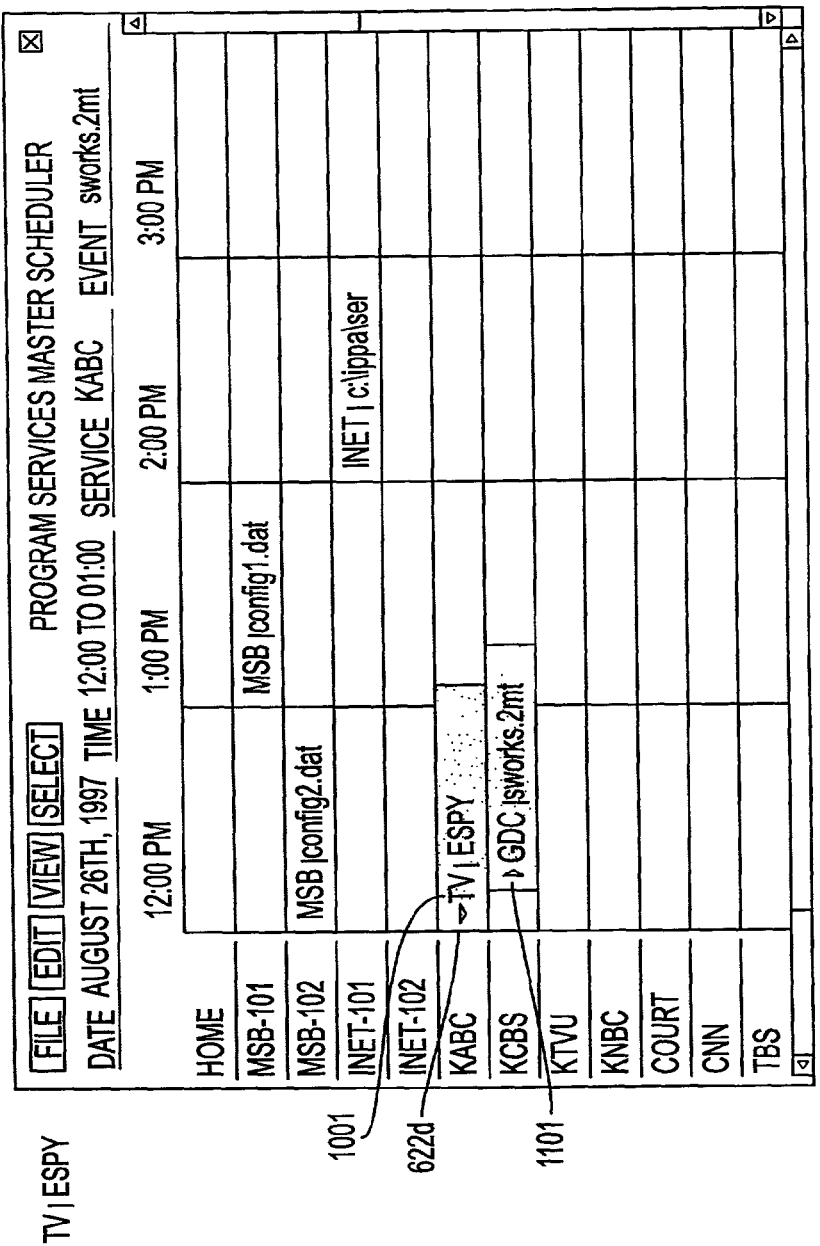

FIG. 11 depicts Cell 622*d* with Primary Event 1001 showing Supporting Event 1101. Supporting Event 1101 is displayed by the user clicking on the triangle icon in the left side of Primary Event 1001. As can be seen, this triangle icon as changed to a downward pointing triangle to indicate that other supporting events are being displayed. Supporting Event 1101 refers to the information in a file identified as "sworks.2mt", which is located in a data carousel slot. As can be seen, Supporting Event 110 also has a right pointing triangle indicating that other events subsidiary to this event. An additional aspect of the display of Supporting Event 1101 is that the supporting event is displayed in a hierarchical fashion, thereby showing the relationship between the primary event and supporting event. This also depicts the relationship of supporting events to primary events in a graph. The invention is not limited to showing the hierarchical structure shown in this embodiment and other methods are known one skilled in the art.

Figure 12:
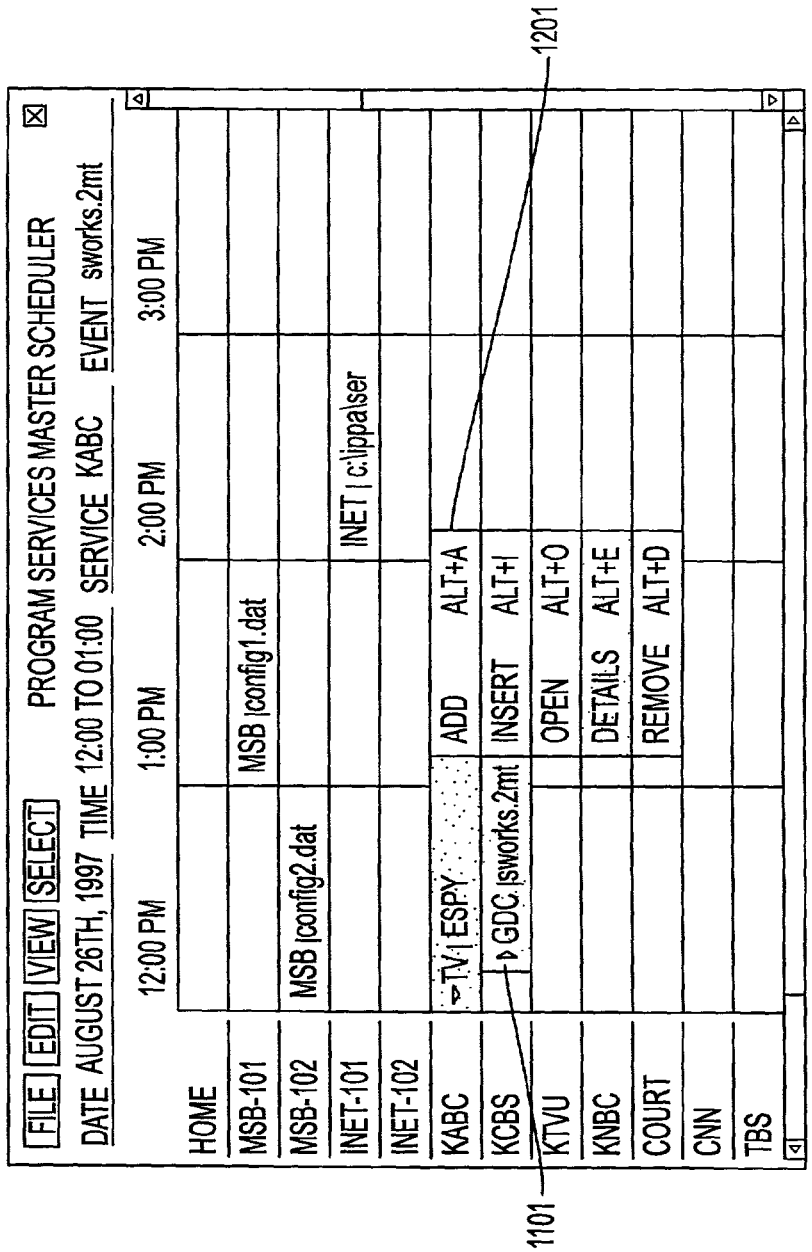

FIG. 12 depicts Menu 1201 which is displayed upon selecting Supporting Event 1101. This menu has menu items which allow the user to Add and Insert additional supporting events, as may be needed for Supporting Event 1101 as a hierarchical structure. The Add menu item is used to append to the list a new supporting event. The Insert menu item is used to insert a new supporting event in the list between two existing supporting events. Also shown are the menu items to Open a service, show the Details of a selected service or Remove the associated service for the primary event. In this figure, the Details menu item is highlighted.

Figure 13:
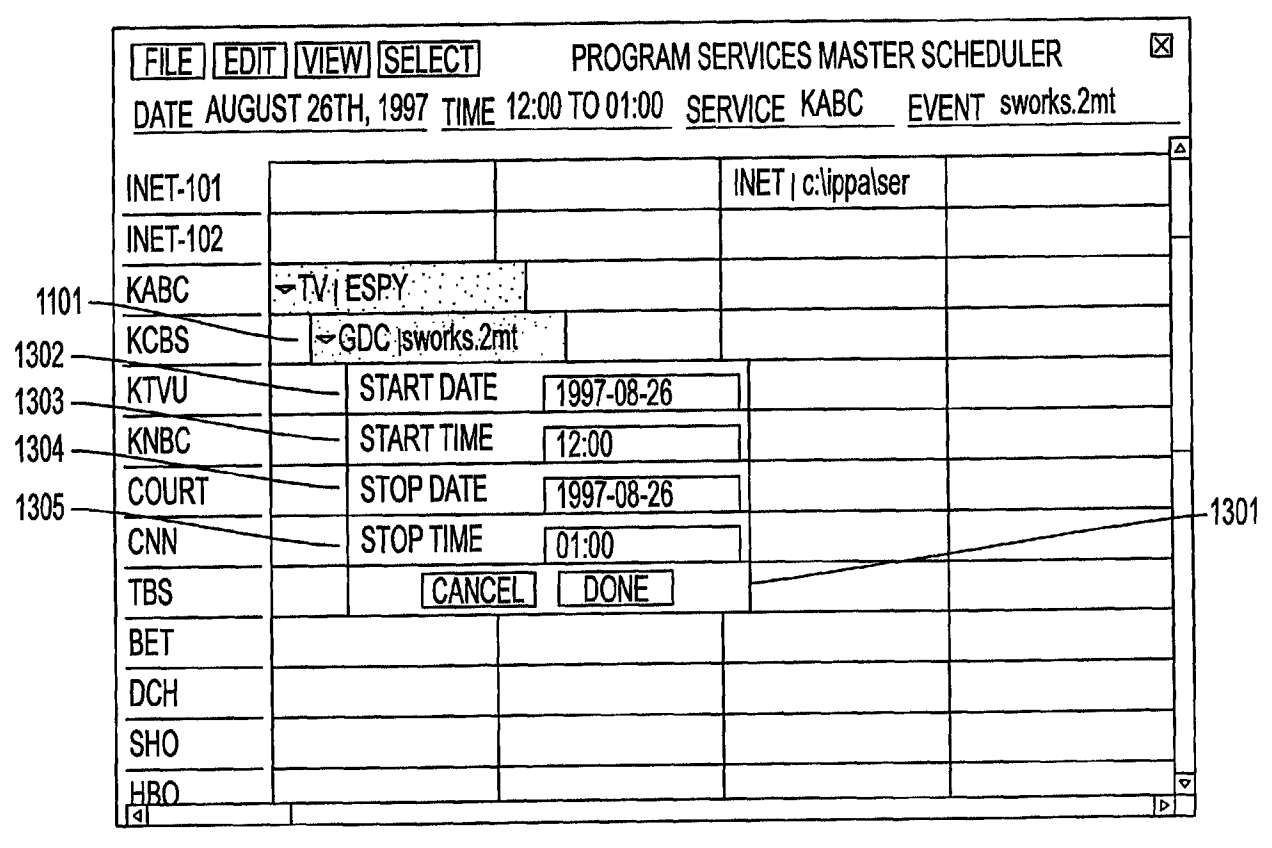

FIG. 13 shows the results of selecting the Details menu selection from Menu 1201 for Supporting Event 1101. In particular, Dialog Box 1301 is showing further detailed information pertaining to Supporting Event 1101. The information shown is that the Supporting Event 1101 is scheduled for Aug. 26, 1997 (Field 1302) at 12:00 (Field 1303) for one hour, stopping at 1:00 (Field 1305) and for one day only (Field 1304). Of course, other information may be shown depending on the level of information desired. Thus, Dialog Box 1301 in an alternative embodiment may display, for instance, information about the location of files relating to that event.

Figure 14:
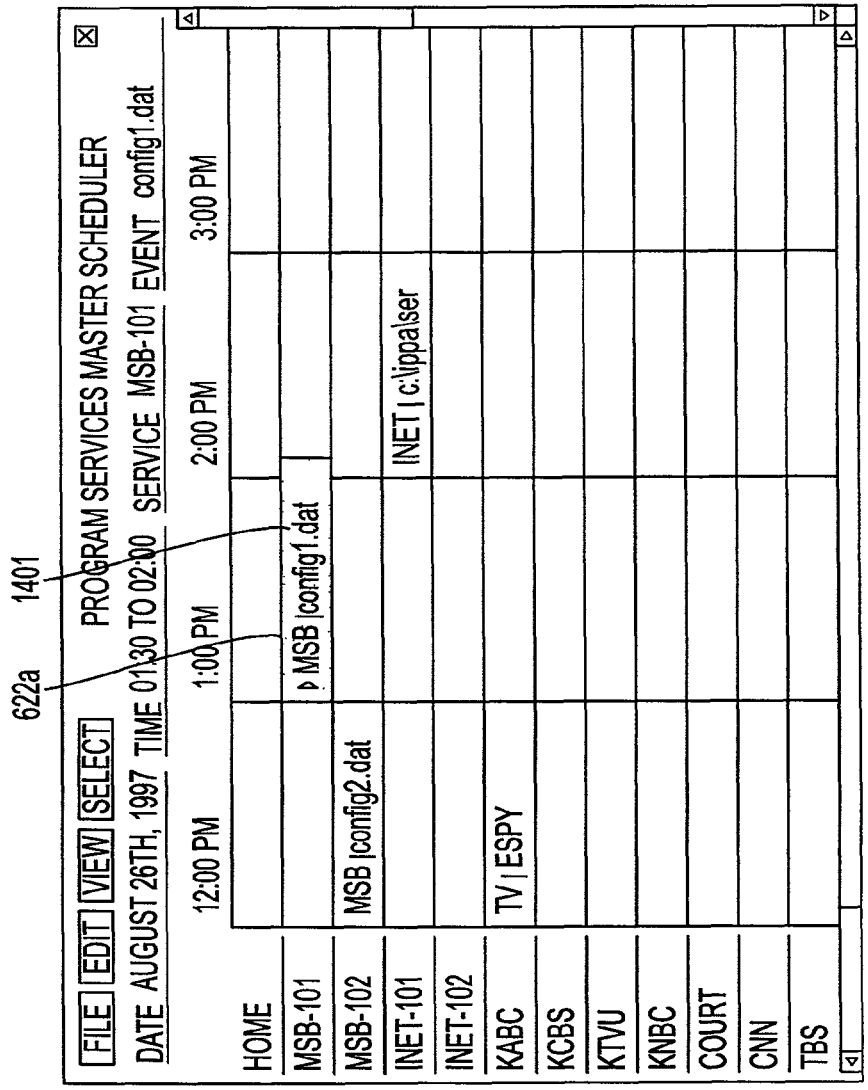
Figure 15:
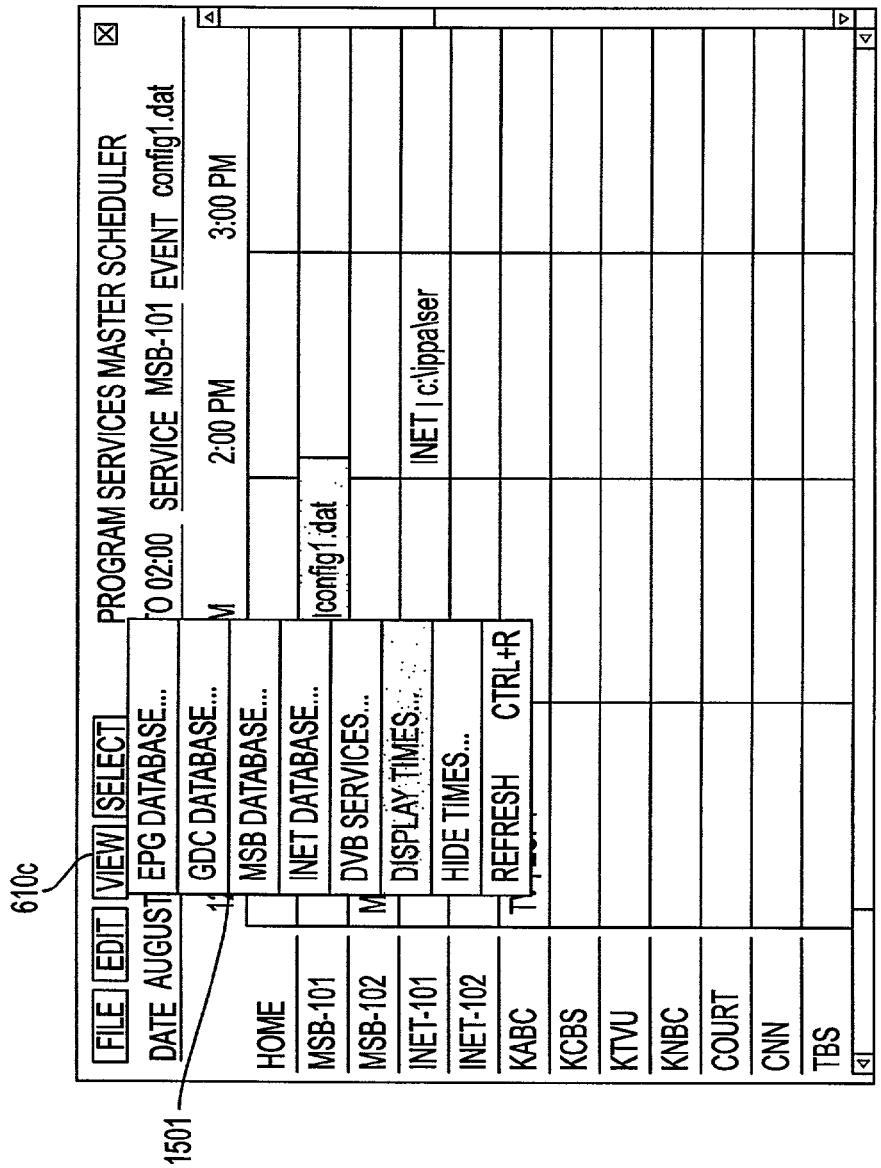
Figure 16:
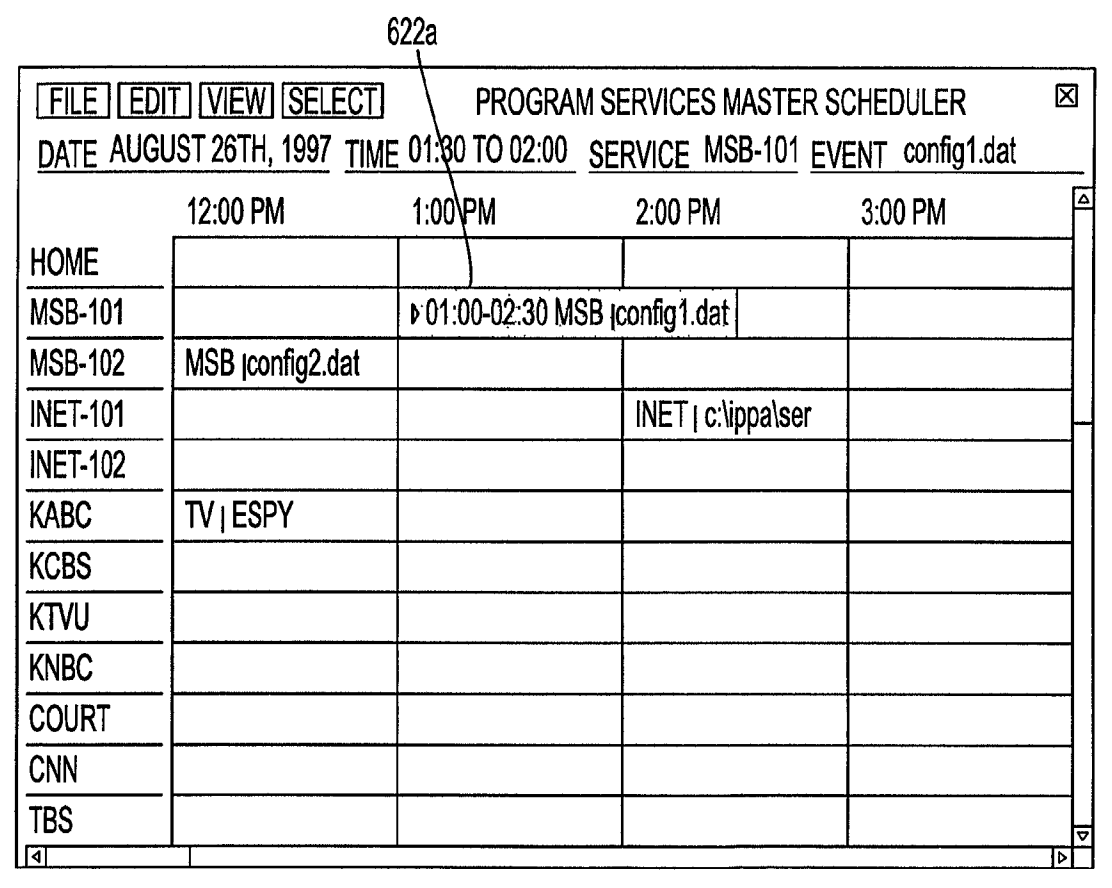

Referring now to FIG. 14, Cell 622*a* shows Primary Event 1401, which details are located in a file "config1.dat." By selecting Control Button 610*c* in FIG. 15, Menu 1501 is displayed. When the Display Times menu item is selected, the time duration is displayed for all selected events. For example, FIG. 16 now shows that Primary Event 1401 has the display times shown as part of its information, in contrast to that shown in FIG. 14. In this example, scheduled time for this Primary Event is one and one-half hour, from 1:00 to 2:30, which is not obvious from the display grid alone. Of course, other ways of indicating such times may be used. One way would be to size Cell 622*a* so that it is proportional to the duration of the event. In this example, the Cell 622*a* would then extend from 1:00 to the midway through column 630*d*. Another way would be to use different colors for each different duration, such as white for half-hour intervals, blue for one-hour intervals. Yet other ways would be different combinations of these ways to display time. Still further, a grid could be used with channels heading the columns and time identifying the rows. Another way would be to display the information in a list format. Other ways would be apparent to those skilled in the art and the specific embodiments shown here are not intended to limit the scope of the invention.

Figure 17:
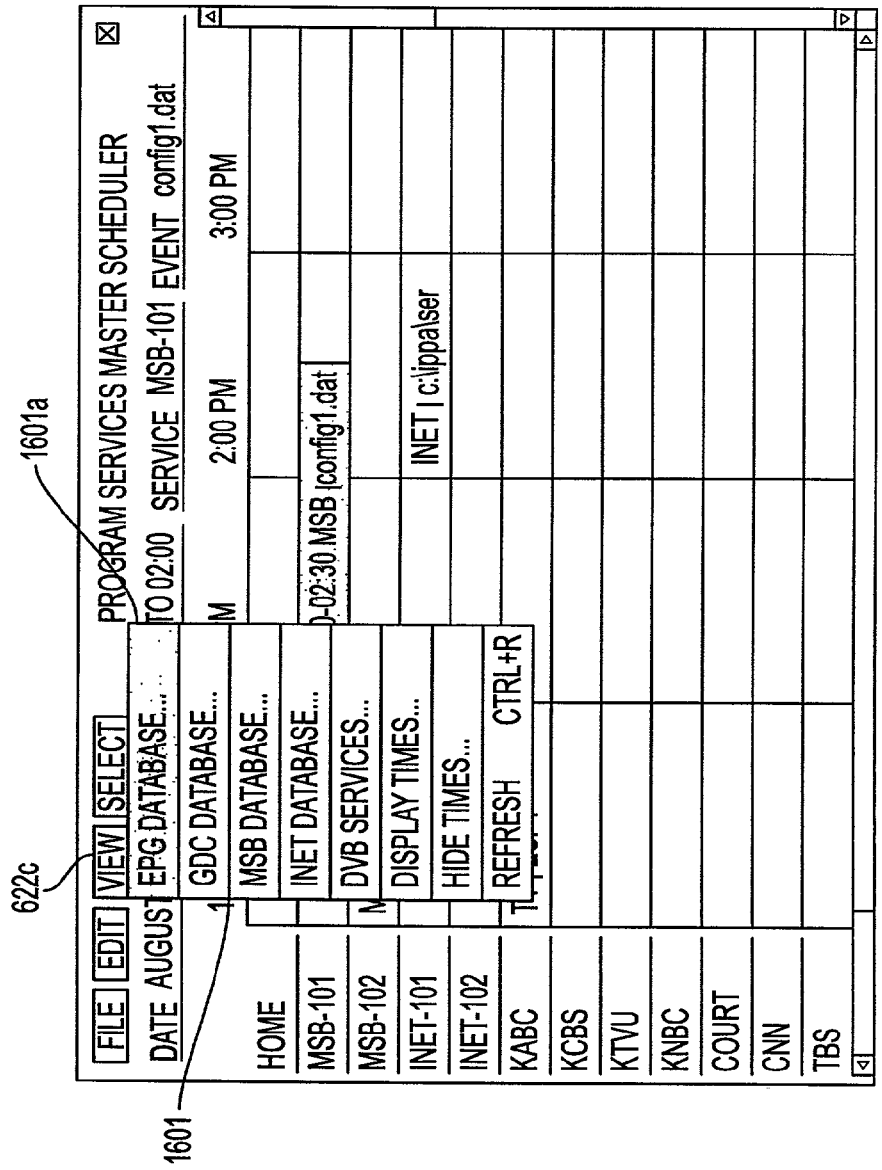

In FIG. 17, Menu Item 1601*a* is selected, the result which is shown in FIG. 18. In particular, FIG. 18 shows an exemplary simplified EPG database, that is, the database for the primary events. Each event is stored as a record, shown here are Records 1820*a* and 1820*b*. Each record is comprised of a number of fields, shown here as Fields (or, in the case of a table, viewed as columns) 1810-1816. ServiceID Field 1810 stores a logical identifier for a service. In the preferred embodiment, the ServiceID is mapped to a channel in a Nagra system. Provider ID Field 1811 indicate the provider of the data. Shown here, Court is the data feed provider for a Court TV channel and KABC-ABC is the provider for the KABC broadcast. Fields 1813-1816 show the times of the services listed provided to the EPG. An alternate view would display some or all supporting events and other pertinent information for each service and event thereby providing a user with varying levels of detail.

FIG. 19 depicts a more detailed editing/display screen for a record in the EPG database. In particular, Program Title Field 1910 holds the name of the program, "ESPY" in this example. ProgramID Field 1911 holds a logical identifier for the ESPY program. Type Field 1912 holds data indicating the type of program, which in this case is a standard television program-type TV. Other types may include, for example, NVOD and INET. PPV Field 1913 indicates whether the program is a pay-per-view program or not.

FIG. 20 depicts an editing/display screen for the GDC database. In particular, AssetURL Field 2010 holds the location for a specific asset for the generic data carousel. SpoolID 2010 holds the logical identifier for a specific spool for a data carousel, that is, a logical grouping of files that may or may not be stored together physically. Bandwidth Field 2012 indicates the bandwidth of the spool. The data in QueueSlot Field 2013 allows the data carousel to assign different priority levels to different assets, thereby affecting the level of responsiveness—which in turn affects the delta variance.

FIG. 21 depicts an editing/display screen for a MSB (Multi-Screen Browser) database records. A multi-screen browser service combines a number of channels onto one screen. Using this technique, the MSB service can show several programs at one time on a television screen where each program is displayed in a reduced format. CombinerID Field 2110 identifies the combiner, a device for integrating multiple channels into one view, for the programs identified in ProgramID Field 1911 for the particular combiner.

FIG. 22 depicts an editing/display screen for the INET (Internet channel) database records. ServiceDescriptionFile Field 2210 identifies the location of the service description file and ServiceName Field 2211 holds the logical name for the Internet service defined in the corresponding service description file. As in the other editing screens, all fields for the database a shown above the field columns, although not all fields may be displayed at one time.

As will be apparent to one skilled in the art, the fields depicted in these exemplary databases are not intended to limit the invention to the specific embodiment shown in the figures. Other fields may be added, depending on the types of services and equipment that is available and not all fields need to be present, depending on the complexity and requirements of the scheduling system.

Illustrative Example

Various aspects of the invention will now be given with reference to an example, which shows other embodiments of various aspects of the invention.

Figure 23A:
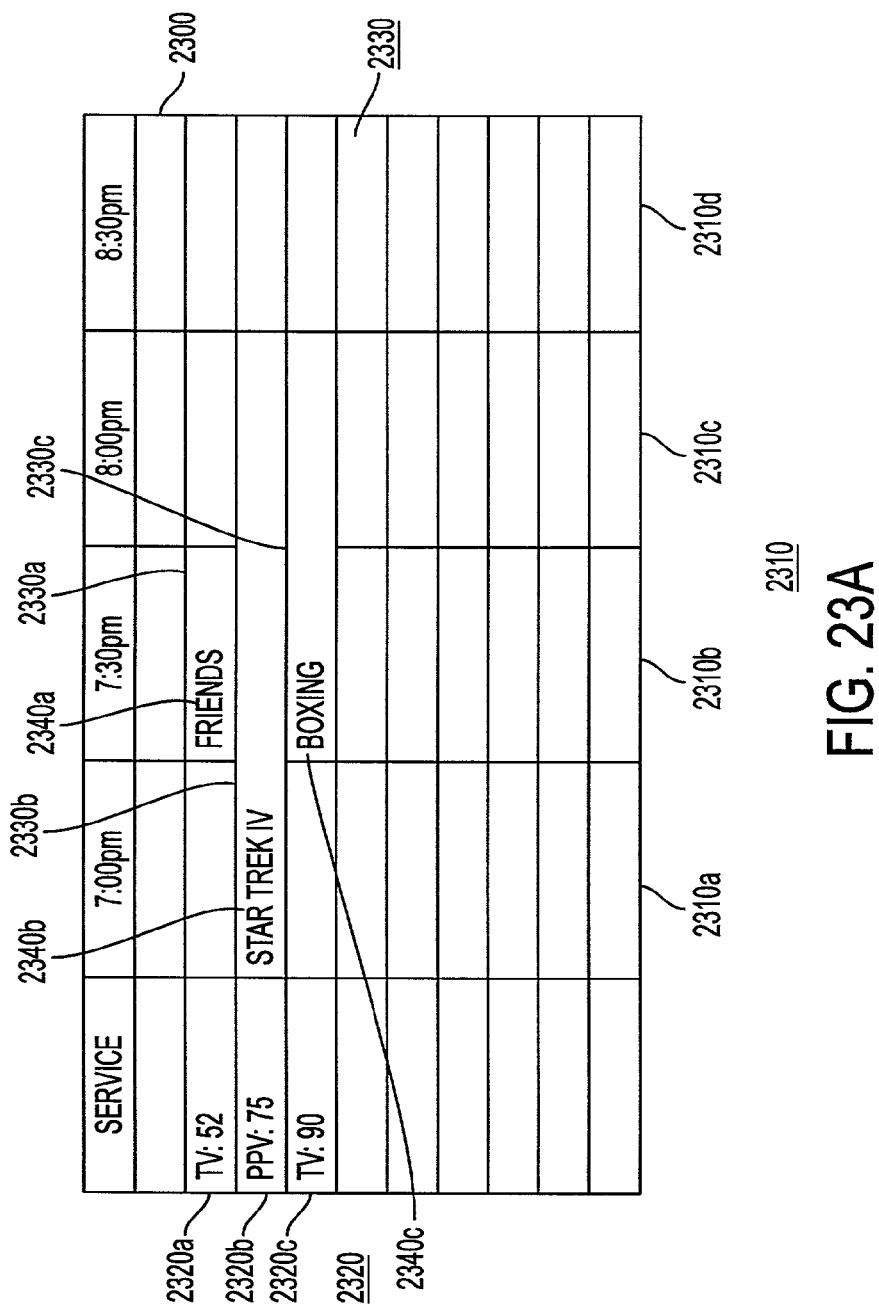
Figure 23B:
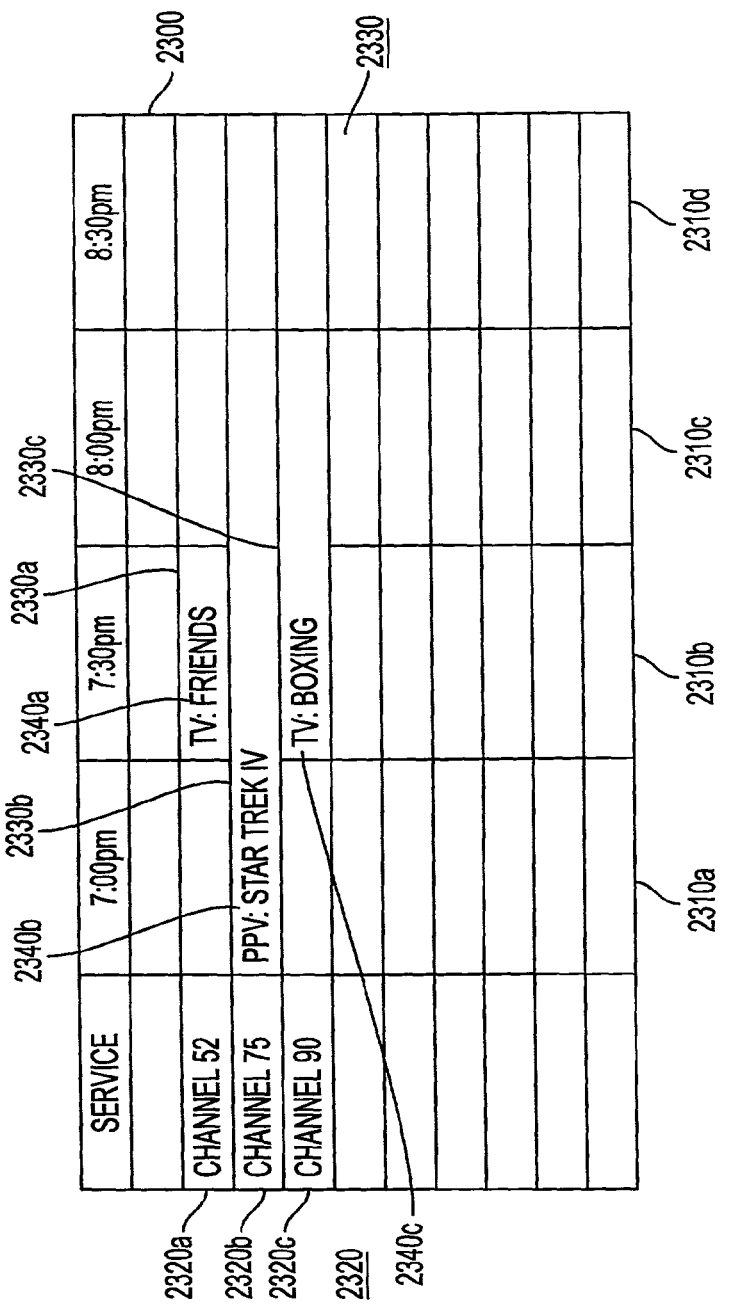

FIGS. 23a and 23b show two embodiments of GUI 2300 used to perform scheduling tasks. GUI 2300 is comprised of Time Columns 2310 (which in the example is shown as Time Columns 2310a-2310d) and Channel Rows 2300 (which example rows are shown as Channel Rows 2320a-2320c). In FIG. 23, Time Columns 2310a-2310d show information pertaining to time slots from 7:00 pm to 8:30 pm, in half-hour increments. Channel Rows 2320a-2320c show the schedule for television channel 52, pay-per-view channel 75, and cable channel 90, respectively. Also shown are Cells 2330a-2330c, which refer to Primary Events 2340a-2340c-"Friends," "Star Trek IV," and "Boxing," respectively. The different embodiments show that the service type may be displayed in a number of different ways, for instance, it may be identified with the service name, such as "TV: 52", in FIG. 23a or with the program, such as "TV: Friends" in FIG. 23b.

In contrast to FIG. 6, FIGS. 23a and 23b illustrates the use of varying the cell size in proportion to the duration of the event. Thus, "Friends" is scheduled for one hour and this is indicated by having Cell 2330a extend from 7:30 pm to 8:00 pm, or one half-hour cell. Likewise, "Star Trek IV" is scheduled for one and one-half hours and this is indicated by having Cell 2330b extend from 7:00 pm to 8:30 pm or three half-hour cells. In the same way Cell 2330c is two half-hour cells to represent a show duration of one hour.

Figure 24E:
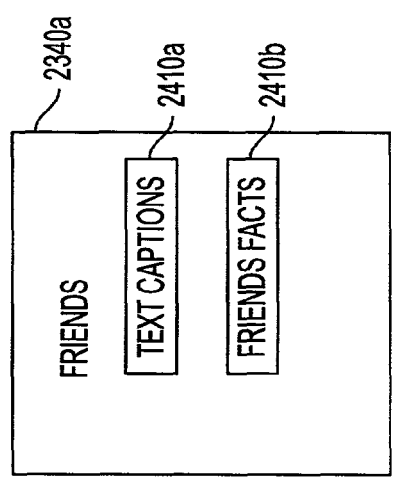
Figure 24F:
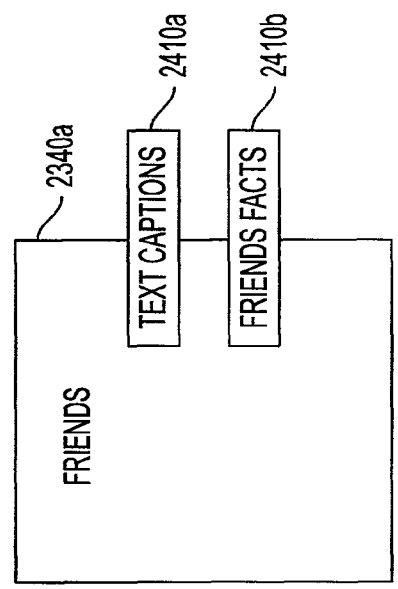

Referring now to FIG. 24a, there is shown Menu 2410 which is displayed upon, for instance, clicking the right button on a mouse when selecting Cell 2330a. A right pointing triangle shows that the Primary Event 2340a has supporting events and to indicate the hierarchical relationship between events. Menu 2410 shows two supporting events, Supporting Events 2410a and 2410b, which were added by the programmer to associate additional multimedia information with Primary Event 2340a. Supporting Event 2410a indicates that a data carousel will make the data in the file "Text_Captions" available to a viewer during the scheduled timeframe. The data from the Text_Captions is from a data carousel. Similarly, Supporting Event 2410b indicates that the IPPA (Internet Push Pull Agent) will make Internet information accessible to a viewer during the scheduled time. Of note that only these two types of events may be selected associated with this type of primary event. Other types of primary events may have the ability to have other supporting event types associated with it for a particular service. Such association is at the discretion of the programmer when creating a service. FIG. 24b shows another embodiment where the supporting events are displayed directly underneath the event which it supports in a hierarchical fashion, in this case Primary Event 2340a. FIGS. 24c-24f show alternative embodiments which may be used to convey the relationships between a primary event and its supporting events.

Referring now to FIG. 25, there is shown the Scheduler Data Model 2500 which show one embodiment which consolidates the primary events and supporting events shown in FIGS. 23a, 23b, 24a and 24b. As will be apparent to one skilled in the art, a single data model does not have to be used and relational data models may be used, for instance, which will simply distribute the information across different data models. Specifically, Scheduler Data Model 2500 is composed of a number of Records 2500, exemplary records numbered as Records 2510a-2510e. Each record is comprised of Fields 2520, individually identified as Fields 2520a-2520g. Of course, it will be apparent to one skilled in the art that these are only exemplary fields, and that additional fields may be added if desired for additional functionality.

Field 2510a holds the eventID, which is a unique identifier for each event. Field 2520b holds the programID, which is a unique identifier for each program and services to identify which events are related to a program. In the example, a particular episode of "Friends", Primary Event 2330a, is assigned a programID of "1". Accordingly, Supporting Events 2410a and 2410b (eventID=1 and 2) for Primary Event 2330a (eventID=1), are also assigned a programID of 1. Field 2520c holds the channel that the primary event and its supporting events are being broadcast on. Hereinafter, eventID=x will be referred to as Event x.

Fields 2520e and 2520f hold the start and end times for each event. Although it is shown here that Events 1-3 are available from 7:30 pm to 8:00 pm, it is not necessary that the all events for a program have the same time slot. For instance, Supporting Event 2410b (Friends Facts) may have a time from 7:30 pm to 7:45 pm. This allows a view to access such information only during the latter half of the show.

Field 2520g contains data referring to the service type. The service type provides more detailed information as to the media that the event is provided on. For instance, Event 1 is of type "TV" indicating that it is a regular television broadcast feed, Event 2 is of type "DC" indicating that the information is from a data carousel. Event 3 is of type "IPPA" indicating that the information is from the Internet. In like fashion, Event 4 (Star Trek IV) is of type NVOD, indicating that it is a pay-per-view movie stored on a NVOD media server and Event 5 (Boxing) is of type TV, which is a television broadcast feed.

Reference is now made for FIGS. 26 and 27 showing portions of Data Models 2600 and 2700 for a data carousel and IPPA media server, respectively. In particular, DC Data Model 2600 is comprised of records 2610. Each record includes Fields 2620a to 2620e. Field 2620a contains the eventID for the supporting service, in this example, Event 2. Field 2620b holds the name and location of the file which contains the supporting text. Field 2620c holds that file's size for use by the system to allocate the resources it may need. Field 2620d holds the process identifier ("PID"), which is the identifier associated with that data so that other devices downstream of the data, such as a STB, can recognize and extract the data from a data stream.

IPPA Data Model 2700 is also comprised of records 2710 and each record has Fields 2720a to 2720c.1tieId 2720a is the eventID for this supporting event, in this case Event 3. Field 2720b contains the URL where the Internet related information may be found. In the preferred embodiment, this may take the form of a URL (Uniform Resource Locator) from an internal or external Web page or even a data file which specifies a combination of Web pages in a manner similar to HTML frames. Field 2720c holds the PID for this data so that other devices downstream of the data, such as a STB, can recognize and extract the data from a data stream.

Figure 28:
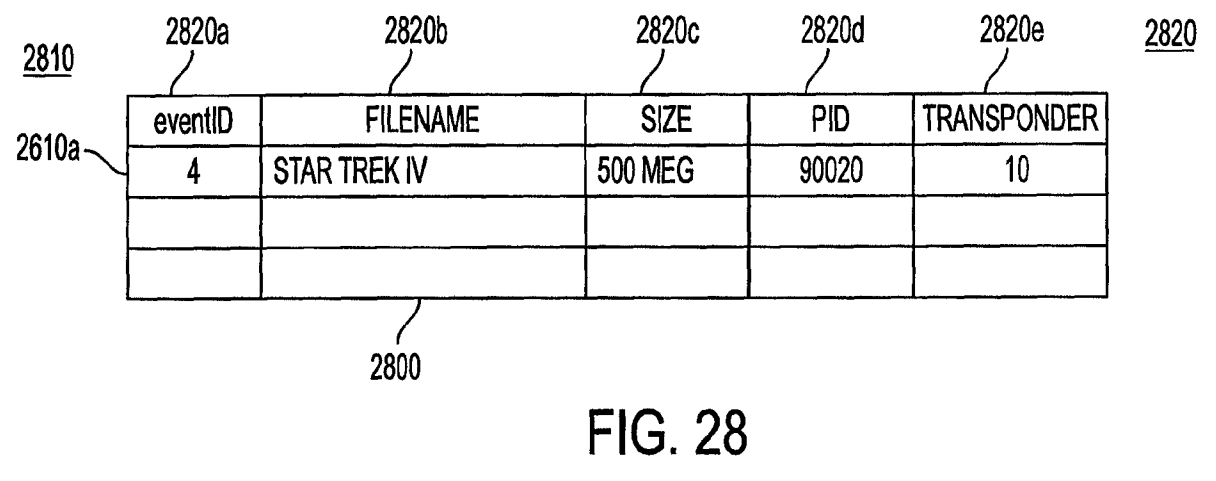

FIG. 28 shows and exemplary NVOD Data Model 2800. This embodiment shows the eventID (Field 2820a), location of the video (Field 2820b), size (Field 2820c), the process identifier (Field 2820d, and the transponder id (Field 2820e).

Data Models 2500, 2600, 2700 and 2800 are only illustrative examples of one embodiment of a data models. Other embodiments will be apparent to those skilled in the art and these specified data models are presented for illustration purposes and are not intended to limit the scope of the invention in any way. Moreover, it is apparent to one skilled in the art that the population of these data models can be accomplished using table manipulation routines, samples of which are provided in Table 1.

Once the schedule has been created, if the programmer then decides to commit to the schedule, Data Models 2500, 2600, 2700 and 2800, data models are populated from the GUI using the table manipulation routines; such as those shown in Table 1. Alternatively, each entry in the data model is committed as soon as the programmer creates the entry in the GUI and the table manipulation routines are used to populate the appropriate data models as the schedule is created. As indicated, each data model may have its own set of specific table manipulation routines specific to the particular field structure of the data model.

Primary events are also registered in Event Publish and Subscribe 420. The purpose of Event Publish and Subscribe 420 is to register When the schedule shown in FIG. 23 has been committed, or alternatively, during the committing of each schedule item, the exemplary system will also populate the tables used by Event Publish and Subscribe 420. FIGS. 29 and 30 depict one embodiment of such tables. In particular, FIG. 29 shows Event Registration Table 2900. The table stores the primary event identifier in Field 2920a and the action of interest to its supporting events. In this example, Field 2920b stores the Change Type, which for Event 1 is of type ChangeTime, indicating that Event 1 would trigger other actions upon it changing to a different time slot. Other Change Types may of course be defined and used as needed, such as ChangeChannel, if the channel of an event will be modified, and so on. FIG. 30 depicts Interest Registration Table 3000 which is used to register routines for events that would be interested when an event in Registration Table 2900 changes. Typically, the event in Registration Table 3000 would be the associated supporting events. Interest Registration Table 3000 stores in Field 3020a the primary or triggering event from Registration Table 2900. Field 3020b stores the ChangeType and Field 3020c stores the table manipulation routine calls that will be used to effect the change for the desired events.

The following exemplary table manipulation routines are used to manipulate Event Registration Table 2900 and Interest Registration Table 3000:

Tmr_RegisterEvent(eventID, changeType)
Tmr_Registerinterest(eventID, changeType, changeParameters)

The following routine is used to change the event time for the identified event:

Tmr_ChangeEventTime(eventID, newTime, endTime)

The following event is used to inform other data models and tables of the change:

Tmr_PostEventChange(psEvent, eventID, changeParameters)

FIGS. 25, 29, 30 and 31 will now be used to illustrate one embodiment of Event Publish and Subscribe 420. When Event 1 (Record 2510a) shown on FIG. 25 is committed, the table manipulation routine below is called to register Event 1 in Event Registration Table 2900.

Tmr_RegisterEvent(1, ChangeTime)

Record 2910a shows the result of the call.

Since this is a television service type, the example defines the use of two supporting types for the sake of illustration. Of course, other supporting types can be used to create a more full featured service. Once the primary event has been registered, the supporting events of interest must be registered. To register, Event Publish and Subscribe 420 calls the routines:

Tmr_Registerinterest(1, ChangeTime, [Tmr_ChangeEventTime, 2, <newtime>]) and
Tmr_Registerinterest(1, ChangeTime, [Tmr_ChangeEventTime, 3, <newtime>]).

Note that the parameter changeParameter of Tmr_RegisterInterest is a parameter list which will vary depending on what is required of the routine begin registered. In this example, the routine Tmr_ChangeEventTime has two parameters, eventID and newTime. The parameter "<newTime>" indicates that the parameter will be filled in by the appropriate time when this routine is called. Furthermore, in this example, the Tmr_ChangeEventTime routine is flexible enough to handle the time change in both the data carousel and IPPA data models. If there was a separate routine for each data model, then the routine calls may take the form:

Tmr_Registerinterest(1, ChangeTime, [Tmr_DCChangeEventTime, 2, <newtime>])
and
Tmr_Registerinterest(1, ChangeTime, [Tmr_IPPAChangeEventTime, 3, <newtime>]).

The result of calling the Tmr_Registerinterest routines is shown in FIG. 30 where the Tmr_ChangeEventTime routines are registered to take effect when a time change to Event 1 occurs. This completes the registration procedures in this example.

Continuing with the example, if the programmer later decides to change Friends from the 7:30 time slot to 9:00, then the following sequence of events will transpire in this embodiment. First, Event Publish and Subscribe 420 will change the time for the primary event. This is accomplished by calling Tmr_ChangeEventTime(1, 9:00 pm).

Note that in the preferred embodiment no end time does not have to be specified. In one embodiment, the end time is specified. In another embodiment, the duration of the show is specified. If only the newTime is specified, Event Publish and Subscribe 420 will assume that the program will have the same length of time as originally scheduled. The result of this call is to update Data Model 2500 as shown in Record 2510a in FIG. 31.

Next Event Publish and Subscribe 420 inspects Event Registration Table 2900 for any dependencies on Event 1. Since Event 1 is registered, dependencies are implied. Also, since Event 1 changed its time, the change would apply to the dependency in this case. Event Publish and Subscribe 420 then calls the routine Tmr_PostEventChange(1, ChangeTime, 9:00 pm)

which will begin the process to execute any registered procedures with events supporting Event 1 for a time change to 9:00 pm.

The Tmr_PostEventChange call operates by scanning Interest Registration Table 3000 for all routines associated with Event 1 and of ChangeType ChangeTime. Here, Records 3010a and 3010b were identified. Event Publish and Subscribe 420 then makes the following calls based on the data stored in Field 3020c:

Tmr_ChangeEventTime, 2, 9:00 pm) and
Tmr_ChangeEventTime, 3, 9:00 pm).

This causes changes to the appropriate data models, which in this example would be Data Model 2500, the results shown in Records 2510b and 2510c in FIG. 31. Event Publish and Subscribe 420 will then determine if there are dependencies on Events 2 and 3 and execute any registered routines for them. In the instant case there are none and the publish and subscribe mechanism completes propagating any further changes.

After the schedule is complete, the operator may choose to create and distribute the tasks based on the schedule. Task Distributor 410 is responsible for creating the tasks. Using Schedule 2500 as shown in FIG. 31 for illustration, Task Distribute 410 creates a number of tasks. In the preferred embodiment these tasks are four-tuples with the form [taskId, assestList, operator, time, data]. With respect to Records

2510*b* and 2510*c*, Task Distributor 410 creates the following two tasks:

[TaskID 1, "Text_Captions", "Play", [9:00 pm, 9:30 pm], [90037, 3]]
[TaskID 2, "Friends_Facts", "Play", [9:00 pm, 9:30 pm], [80716]]

In this example, the "Play" operator indicates to the media server that it should begin playing/transmitting the requested data at the specified time. As will be known to those skilled in the art, other operators may be available, depending on the media server and functionality desired.

The tasks are then placed in Thread Pool and Queue 430 which tracks and controls the distribution of the tasks and receipt of status messages. A the appropriate time or command, Thread and Pool Queue 430 distributes the task to the appropriate media server through Master/Slave Scheduler API 180*a*. In this example, TaskID 1 is distributed to the data carousel and TaskID 2 is distributed to the IPPA. In addition, Thread Pool and Queue 430 logs the distributed tasks to track the status of those tasks.

TaskID 1 and 2 received by the data carousel and IPPA media servers' respective Timeline and Task Management 510 units. The Timeline and Task Management Unit 510 tracks the tasks received for the media server and controls the execution of a task on the media server.

FIG. 32*a* shows one embodiment of a queue, Queue 3200, maintained by Time and Task Management Unit 510 for the data carousel. In particular, Time and Task Management Unit 510 stores in Queue 3200 information needed by the media server to deliver the requested asset. For instance, Queue 3200 may contain the date in Field 3210 and the start and stop time that the asset, identified in Asset List 3210*g*, should be delivered in Fields 3210*b* and 3210*c*. The start time in Field 3210*b* has been adjusted to account for the delta variance of three (3) seconds for this exemplary media server. TaskID is a unique task identifier. In this example, the TaskID is the concatenation of a Master Scheduler ID (assumed to be "1") and the EventID. Other way of obtaining a unique TaskID are known to those skilled in the art. Fields 3210*e* and 3210*f* contains the command and associated command data to be executed Task Translation 520.

FIG. 32*b* illustrates another embodiment similar to that shown in FIG. 32*a*, but with the start time (Field 3210*b*) unadjusted, but with an additional field, Field 3210*h*, which holds the time the task is to be executed after adjusting for the delta variance.

FIGS. 33*a* and 33*b* shows Queue 3300 for the IPPA media server and fields similar to that shown in FIGS. 32*a* and 32*b*. As will be apparent to one skilled in the art, the delta variance may have been provided by Master Scheduler 120, as in FIG. 3200, or may be known by the media server itself, as in FIG. 3300, or other such embodiments, and the delta variance may be different for different media server commands.

Moreover, other embodiments of Queue 3300 may indicate the delta variance to be used, although in the preferred embodiment, the media server has a single preset delta variance. One such embodiment may be for the media server to know the delta variance, but nevertheless store it in a queue such as shown in FIGS. 32*a* and 32*b* to simplify processing at the appropriate time.

In the preferred embodiments, all tuples received from the Master Scheduler are stored in the queue and the queues are stored sorted by time, thus the system can easily determine the next task to execute by simply examining the top of the queue.

At the indicated time the task (the tuple, unadjusted or otherwise adjusted with a delta variance), is removed from the queue, such as the queues shown in FIGS. 32*a*, 32*b*, 33*a* and 33*b*, and passed to Task Translation 520. Task Translation 520 translates the requested task into one or more media server specific tasks. The "Play" task sent by the Master Scheduler may, for instance, be translated into a number of tasks for a data carousel, such as DC_Initialize_Slot, DC_Load_Slot, DC_Transmit_Slot_Data. In the preferred embodiment a FSM is spawned to track these tasks and report back to Master Scheduler 120 the status of the "Play" task. FIG. 34 shows an example of a high-level FSM 3400 for the Play task. Specifically, FSM 3400 enters ttLoaded State 3410 and proceeds to ttExecute State 3420. If all the media specific tasks executed correctly, then FSM 3400 proceeds to ttComplete State 3440, otherwise FMS 3400 proceeds to ttError State 3430.

Block 3450 shows that ttExecute State 3420 translates into a number of device specific API calls (and other code, if desired) corresponding to a data carousel "Play" command. At the conclusion of each device specific API call, FSM 3400 either proceeds to the next task or goes to ttError State 3430 for reporting the error back to Master Scheduler 120. Each device specific API call will then, through Device Specific API 190*a*, control the appropriate bit-pump.

In the manner described above, the present invention thus provides a system and method to associate and control multimedia events with a primary event and to provide a system and method for a distributed multimedia scheduling system. While this invention has been described with reference to the preferred embodiments, other modifications will become apparent to those skilled in the art by study of the specification and drawings. It is thus intended that the following appended claims include such modifications as fall within the spirit and scope of the present invention.

What I claim is:

1. A method comprising:
processing a programming schedule on a master scheduler to create a plurality of tasks associated with a second media server for a first media server;
distributing the plurality of tasks to a slave scheduler associated with the first media server;
determining that a heartbeat was not received from the second media server, wherein the processing of the programming schedule on the master scheduler to create the plurality of tasks for the first media server is based on a determination that the heartbeat was not received;
determining, by the master scheduler, that the heartbeat from the second media server has resumed; and
in response to resumption of the heartbeat from the second media server, reassigning any unexpired tasks from among the plurality of tasks associated with the second media server back to the second media server.

2. The method of claim 1, further comprising:
receiving the programming schedule on the master scheduler, wherein the processing of the programming schedule is in response to the receiving of the programming schedule.

3. The method according to claim 1, further comprising:
transmitting a notification from the slave scheduler to the master scheduler based upon the processing of the task.

4. The method according to claim 3, further comprising:
receiving the notification from the slave scheduler on the master scheduler; and
updating a database associated with the master schedule based on the receiving of the notification.

5. The method of claim 1, wherein the processing of the programming schedule creates an additional task for the first media server, wherein the programming schedule includes a first record including a first event identifier and a program identifier for a primary event, the primary event being scheduled to occur within a time period, the programming schedule further including a second record including a second event identifier and the program identifier for a supporting event, the second event identifier being different than the first event identifier, and wherein the task is associated with the primary event and the additional task is associated with the supporting event.

6. The method of claim 5, wherein the task is associated with a request to change a time period of the primary event on the slave scheduler, the method further comprising:
changing the time period of the primary event on the slave scheduler; and
in response to changing the time period of the primary event, changing the time period of the supporting event.

7. The method according to claim 1, wherein the programming schedule includes event information.

8. The method according to claim 1, wherein the task is distributed to the slave scheduler in real-time.

9. The method according to claim 1, wherein the first media server operates independently of the master scheduler.

10. The method of claim 1, wherein the master scheduler operates on a first computing device and the slave scheduler and the first media server operate on a second computing device, the second computing device being a different device than the first computing device.

11. The method according to claim 1, wherein the slave scheduler operates on the first media server.

12. The method according to claim 1, wherein a device specific command is executed on a bitpump of the first media server, the bitpump being capable of controlling and retrieving data from a storage device.

13. The method of claim 1, wherein the slave scheduler is a first slave scheduler, the method further comprising:
processing the task on the first slave scheduler to create a device specific command for the first media server;
executing the device specific command on the first media server based on the processing of the task;
processing the programming schedule on the master scheduler to create the task for the second media server;
distributing the task to a second slave scheduler; and
processing the task on the second slave scheduler to create the device specific command for the second media server.

14. A computer-readable storage medium comprising computer-readable instructions, which when executed by a processor, cause the processor to:
process a programming schedule on a master scheduler to create a plurality of tasks associated with a second media server for a first media server;
distribute the plurality of tasks to a slave scheduler associated with the first media server;
determine that a heartbeat was not received from the second media server, wherein the processing of the programming schedule on the master scheduler to create the plurality of tasks for the first media server is based on a determination that the heartbeat was not received;
determine, by the master scheduler, that the heartbeat from the second media server has resumed; and
in response to resumption of the heartbeat from the second media server, reassign any unexpired tasks from among the plurality of tasks associated with the second media server back to the second media server.

15. A system for providing failure recovery in a media server, the system comprising:
a first media server configured to execute a first task at a first predetermined time and to produce a first heartbeat signal;
a second media server configured to execute a second task at a second predetermined time and to produce a second heartbeat signal; and
a master scheduler coupled to the first media server and the second media server and configured to transform a schedule of events into at least the first task and the second task, and to monitor the first heartbeat signal and the second heartbeat signal,
wherein the master scheduler is configured to detect an absence of the first heartbeat signal and to reassign the first task to the second media server in response to the detected absence, and
wherein in response to resumption of the first heartbeat signal of the first media server, the master scheduler is configured to reassign the first task back to the first media server.

16. The system of claim 15, wherein the master scheduler is configured to detect an absence of the second heartbeat signal and to reassign the second task to the first media server in response to the detected absence.

17. The system of claim 16, wherein in response to resumption of the second heartbeat signal of the second media server, the master scheduler is configured to reassign the second task back to the second media server.

* * * * *

UNITED STATES PATENT AND TRADEMARK OFFICE
CERTIFICATE OF CORRECTION

| | | |
|---|---|---|
| PATENT NO. | : 8,566,897 B2 | Page 1 of 2 |
| APPLICATION NO. | : 13/117437 | |
| DATED | : October 22, 2013 | |
| INVENTOR(S) | : Sequeira | |

It is certified that error appears in the above-identified patent and that said Letters Patent is hereby corrected as shown below:

On the Title Page, in Column 1, under "Related U.S. Application Data", Line 1, delete Item "(60)" and insert Item -- (62) --, therefor.

In the Specification:

In column 4, Line 59, delete "movie a" and insert -- movie at --, therefor.

In Column 6, Line 38, delete "art an may" and insert -- art and may --, therefor.

In Column 8, Lines 12-13, delete "Data Model 320c," and insert -- Data Model 320e, --, therefor.

In Column 10, Line 27, delete "API 130" and insert -- API 180 --, therefor.

In Column 10, Line 31, delete "API 130" and insert -- API 180 --, therefor.

In Column 10, Line 39, delete "API 130." and insert -- API 180. --, therefor.

In Column 10, Line 48, delete "long a" and insert -- long as --, therefor.

In Columns 11 & 12, in Table 2, under "Fields", Line 13, delete "mastereId" and insert -- masterId --, therefor.

In Columns 11 & 12, in Table 2, under "Comments", Line 25, delete "salve" and insert -- slave --, therefor.

In Columns 11 & 12, in Table 2, under "Comments", Line 32, delete "{tasks)" and insert -- (tasks) --, therefor.

Signed and Sealed this
Twenty-seventh Day of May, 2014

Michelle K. Lee
*Deputy Director of the United States Patent and Trademark Office*

CERTIFICATE OF CORRECTION (continued)
U.S. Pat. No. 8,566,897 B2

In Columns 11 & 12, in Table 2, under "Comments", Line 42-43, delete "if an when it encounters and error" and insert -- if and when it encounters an error --, therefor.

In Columns 11 & 12, in Table 2, under "Fields", Line 39, delete "mastered" and insert -- masterId --, therefor.

In Columns 13 & 14, in Table 2, under "Fields", Line 7, delete "mastereId" and insert -- masterId --, therefor.

In Columns 13 & 14, in Table 2, under "Fields", Line 12, delete "mastered" and insert -- masterId --, therefor.

In Column 13, Line 62, delete "API 130" and insert -- API 180 --, therefor.

In Column 13, Line 63, delete "API 130a" and insert -- API 180a --, therefor.

In Columns 15 & 16, in Table 3, under "FIELDS", Line 5, delete "<assetlist>" and insert -- <asset_list> --, therefor.

In Columns 15 & 16, in Table 3, under "COMMENTS", Line 8, delete "<asset list>" and insert -- <asset_list> --, therefor.

In Columns 15 & 16, in Table 3, under "COMMENTS", Line 12, delete "<op_spec_clata>" and insert -- <op_spec_data> --, therefor.

In Column 15, Line 64, delete "'series" and insert -- series --, therefor.

In Column 16, Line 36, delete "that that" and insert -- that --, therefor.

In Column 16, Line 37, delete "users" and insert -- user's --, therefor.

In Column 16, Line 51, delete "filed" and insert -- field --, therefor.

In Column 16, Line 54, delete "filed" and insert -- field --, therefor.

In Column 18, Lines 30-31, delete "SpoolID 2010" and insert -- SpoolID 2011 --, therefor.

In Column 20, Line 42, delete "2720c. 1tieId 2720a" and insert -- 2720c. Field 2720a --, therefor.

In Column 21, Lines 38-39, delete "changeParameters)" and insert -- changeParameters). --, therefor.

In Column 21, Lines 45-46, delete "changeParameters)" and insert -- changeParameters). --, therefor.

In Column 24, Line 14, delete "FMS" and insert -- FSM --, therefor.